United States Patent
Rhee et al.

(10) Patent No.: US 9,534,909 B2
(45) Date of Patent: Jan. 3, 2017

(54) USER TERMINAL DEVICE PROVIDING SERVICE BASED ON PERSONAL INFORMATION AND METHODS THEREOF

(71) Applicant: SAMSUNG Electronics Co., Ltd., Suwon-si, Gyeonggi-do (KR)

(72) Inventors: Young-ho Rhee, Yongin-si (KR); Eun-young Lim, Seoul (KR); Young-shil Jang, Suwon-si (KR); Il-ku Chang, Seongnam-si (KR); Young-kyu Jin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/905,831

(22) Filed: May 30, 2013

(65) Prior Publication Data

US 2013/0325332 A1    Dec. 5, 2013

(30) Foreign Application Priority Data

Jun. 1, 2012 (KR) .................. 10-2012-0059455

(51) Int. Cl.
*G01C 21/00* (2006.01)
*G01C 21/34* (2006.01)
(Continued)

(52) U.S. Cl.
CPC .............. *G01C 21/34* (2013.01); *G01C 21/00* (2013.01); *G01C 21/362* (2013.01);
(Continued)

(58) Field of Classification Search
CPC ... G01C 21/00; G01C 21/3688; G01C 21/362; G06F 3/0482
(Continued)

(56) References Cited

U.S. PATENT DOCUMENTS 8,073,590 B1*  12/2011  Zilka ................... H04M 1/6083
                                                            340/572.3
2003/0156097 A1*  8/2003  Kakihara ........... G01C 21/3688
                                                            345/156
(Continued)

FOREIGN PATENT DOCUMENTS

| JP | 2000146617 | 5/2000 |
|---|---|---|
| JP | 2000205882 | 7/2000 |

(Continued)

OTHER PUBLICATIONS

Partial European Search Report dated Oct. 1, 2014 in European Patent Application No. 13167989.6.
(Continued)

*Primary Examiner* — Rodney Butler
*Assistant Examiner* — Frederick Brushaber
(74) *Attorney, Agent, or Firm* — Staas & Halsey LLP

(57) ABSTRACT

A service providing method of a user terminal device connected to a display apparatus mounted on a moving means includes displaying a stored contact list and guiding one or more routes which displays a route guide screen to selected address information by utilizing a display apparatus if the address information is selected from personal information recorded on the displayed contact list. Accordingly, various services can be provided based on the personal information.

9 Claims, 31 Drawing Sheets

(51) Int. Cl.
*G06F 3/0482* (2013.01)
*G01C 21/36* (2006.01)
*G06F 3/0484* (2013.01)

(52) U.S. Cl.
CPC ....... *G01C 21/3688* (2013.01); *G06F 3/0482* (2013.01); *G06F 3/04842* (2013.01)

(58) Field of Classification Search
USPC .................................. 701/487, 538; 715/810
See application file for complete search history.

(56) References Cited

U.S. PATENT DOCUMENTS

| | | | | |
|---|---|---|---|---|
| 2007/0016362 A1* | 1/2007 | Nelson | ................. | G01C 21/362 701/425 |
| 2007/0043503 A1* | 2/2007 | Oesterling | ............ | G01C 21/00 701/431 |
| 2007/0233378 A1* | 10/2007 | Tanaka | ............... | G01C 21/3664 701/456 |
| 2008/0027643 A1* | 1/2008 | Basir | ................ | G01C 21/362 701/469 |
| 2008/0036586 A1* | 2/2008 | Ohki | .................... | G01C 21/362 340/539.13 |
| 2008/0036778 A1* | 2/2008 | Sheha | .................... | G01C 21/20 345/502 |
| 2008/0167937 A1* | 7/2008 | Coughlin | ............... | G01C 21/20 705/7.16 |
| 2008/0319652 A1* | 12/2008 | Moshfeghi | ......... | G01C 21/3667 701/532 |
| 2008/0319653 A1* | 12/2008 | Moshfeghi | ......... | G01C 21/3608 701/532 |
| 2008/0320419 A1* | 12/2008 | Matas | .................... | G01C 21/20 715/863 |
| 2010/0097239 A1* | 4/2010 | Campbell | ........... | B60R 11/0252 340/4.4 |
| 2010/0117810 A1* | 5/2010 | Hagiwara | ............. | G06F 3/0483 340/425.5 |
| 2010/0128570 A1* | 5/2010 | Smith | ................ | G07C 9/00944 368/10 |
| 2010/0222079 A1* | 9/2010 | Lee | ..................... | G01C 21/343 455/456.3 |
| 2011/0086678 A1* | 4/2011 | Suzuki | ............... | H04M 1/6091 455/569.2 |
| 2011/0134835 A1 | 6/2011 | Kamps et al. | | |
| 2011/0137490 A1 | 6/2011 | Bosch et al. | | |
| 2011/0164053 A1 | 7/2011 | Nakamura et al. | | |
| 2011/0164062 A1 | 7/2011 | Nakamura et al. | | |
| 2011/0166748 A1* | 7/2011 | Schneider | .............. | B60K 35/00 701/36 |
| 2011/0167371 A1* | 7/2011 | Sheha | .................... | G01C 21/20 715/769 |
| 2011/0167390 A1 | 7/2011 | Reed, Jr. et al. | | |
| 2011/0257973 A1* | 10/2011 | Chutorash | .......... | G01C 21/3661 704/235 |
| 2011/0263293 A1* | 10/2011 | Blake | ..................... | B60K 35/00 455/557 |
| 2011/0270600 A1* | 11/2011 | Bose | ..................... | G06F 9/4445 703/17 |
| 2012/0036441 A1* | 2/2012 | Basir | ..................... | H04M 1/642 715/734 |
| 2012/0313768 A1* | 12/2012 | Campbell | ........... | B60R 25/2009 340/438 |

FOREIGN PATENT DOCUMENTS

| | | |
|---|---|---|
| JP | 4476607 | 6/2010 |
| KR | 10-0521055 | 10/2005 |
| KR | 1020070051523 | 5/2007 |
| KR | 10-0800084 | 1/2008 |
| KR | 10-0987516 | 10/2010 |

OTHER PUBLICATIONS

Extended Europe Search Report dated Feb. 5, 2015 in European Patent Application No. 13167989.6.
Nate Riesen, "Toyota Entune in a 2012 Toyota. What else can it do?", XP054975662, uploaded to the internet Jan. 10, 2012 URL:https:jjwww.youtube.comjwatch?v=qGioYRiwXwY.
U.S. Appl. No. 15/083,677, filed Mar. 29, 2016, Young-ho Ree, Samsung Electronics Co., Ltd.

* cited by examiner

USER TERMINAL DEVICE PROVIDING SERVICE BASED ON PERSONAL INFORMATION AND METHODS THEREOF

CROSS-REFERENCE TO RELATED APPLICATIONS

This application claims priority under 35 U.S.C. §119 from Korean Patent Application No. 10-2012-0059455, filed on Jun. 1, 2012, in the Korean Intellectual Property Office, the disclosure of which is incorporated herein by reference in its entirety.

BACKGROUND OF THE INVENTION

1. Field of the Invention

Devices and methods consistent with what is disclosed herein relate to a user terminal device and methods providing services thereof, and more specifically, to a user terminal device which provides various services based on personal information and methods of providing services thereof.

2. Description of the Related Art

According to recent technological development, various types of user terminal devices such as mobile phones, PDAs, MP3 players, and tablet PCs are distributed and used.

The user terminal devices are enhanced in terms of functions and can implement various types of applications. Therefore, multiple services, such as a contents playing service, a GPS service, a game service, and a schedule managing service, are provided. While using the services, a user can store and utilize various personal information in the user terminal device.

For example, acquaintances' telephone numbers, user's schedules, to-do list, or memos may be stored and used in user terminal device.

However, the conventional user terminal devices only provide limited methods of utilizing personal information. For example, a user of a conventional user terminal device generally has a contact list of acquaintances' names and telephone numbers displayed, selects telephone number from the contact list, and calls the telephone number. Likewise, in using a plan organizer recording therein a schedule or a to-do list, a user simply checks the schedule directly and goes as planned according to the schedule.

Accordingly, a new method is necessary for a user to be able to use personal information more variously and efficiently.

SUMMARY OF THE INVENTION

The present general inventive concept provides a user terminal device which can provide various services by utilizing personal information and a service providing method thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a service providing method of a user terminal device connected to a display apparatus mounted on a moving means, the service providing method including displaying a contact list stored in the user terminal device, and guiding one or more routes by displaying a route guide screen to selected address information using the display apparatus, if the address information is selected from among personal information recorded in the displayed contact list.

The guiding routes may include implementing a GPS program and creating the route guide screen in the user terminal device, if the address information is selected, and transmitting the route guide screen to the display apparatus and displaying the route guide screen on the display apparatus.

The guiding routes may include transmitting the address information to the display apparatus, if the address information is selected. The route guide screen may be created by a GPS program implemented in the display apparatus.

The service providing method may additionally include monitoring to determine whether an event matching schedule information stored in the user terminal device occurs, and creating the route guide screen to a place matching the event, if the event occurs, transmitting the route guide screen to the display apparatus, and displaying the route guide screen on the display apparatus.

The service providing method may additionally include searching for external devices storing schedule information overlapped with schedule information matching the event, if the event occurs, displaying a list of users regarding the searched external devices, and re-creating the route guide screen by updating positions of selected users, if one or more users are selected from the list, transmitting the re-created route guide screen to the display apparatus, and displaying the route guide screen on the display apparatus.

The service providing method may additionally include sharing all the screens displayed on the user terminal device with the display apparatus, if the user terminal device connects to the display apparatus.

The foregoing and/or other features and utilities of the present general inventive concept may also be achieved by providing a user terminal device, which may include an interface which connects to a display apparatus mounted on a moving means, a storage which stores a contact list, a display which displays the contact list stored in the storage, and a controller which utilizes the display to display a route guide screen to a selected address information, if the address information is selected from among personal information recorded on the displayed contact list.

Herein, if the address information is selected, the controller may implement a GPS program, create the route guide screen, and transmit the route guide screen via the interface to the display apparatus.

If the address information is selected, the controller may transmit the address information via the interface to the display apparatus, and the route guide screen may be created and displayed by a GPS program which is implemented on the display apparatus.

The controller may monitor to determine whether an event matching schedule information stored in the user terminal device occurs or not, create a route guide screen to a place matching the event if the event occurs, and display route guide screen using the display apparatus.

The controller may search for external devices storing schedule information overlapped with schedule information matching the event, if the event occurs, display a list of users regarding the searched external devices, re-create the route guide screen by updating positions of selected users, if one or more users are selected on the list, and display the re-created route guide screen using the display apparatus.

If the display apparatus connects to the user terminal device via the interface, the controller may share screen displayed on the display with the display apparatus.

The foregoing and/or other features and utilities of the present general inventive concept may also be achieved by providing a method of utilizing personal information of a user terminal device, the method which may include creating a brief screen by utilizing the personal information of the user terminal device and displaying the brief screen through a display apparatus if the user terminal device is connected to the display apparatus mounted on a moving means, creating a menu screen and displaying the menu screen through the display apparatus if a user command to discard the brief screen is inputted, creating a screen including the personal information corresponding to a selected menu and displaying the created screen through the display apparatus if one menu is selected from the menu screen, and creating a service screen corresponding to the selected personal information and displaying the service screen by utilizing the display apparatus if one personal information is selected from the screen.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
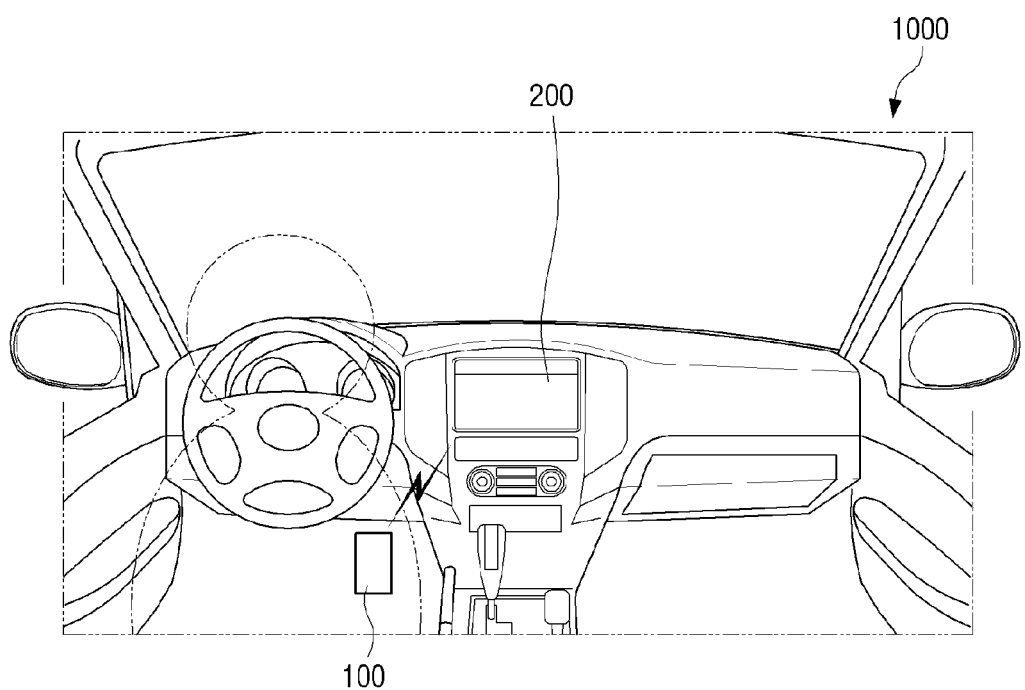
FIG. 1 is a diagram illustrating operations of a user terminal device and a display apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

FIG. 1 is a diagram illustrating operations of a user terminal device 100 and a display apparatus 200 according to an embodiment of the present general inventive concept.

Referring to FIG. 1, the user terminal device 100 may be connected to the display apparatus 200 mounted on a moving means 1000. The user terminal device 100 may be implemented as various portable devices, such as mobile phones, PDAs, tablet PCs, MP3 players, laptop PCs, or electronic keys. Further, the moving means 1000 may be various types of transport vehicles, such as cars, ships, airplanes, helicopters, or auto bikes. The display apparatus 200 may be an apparatus such as a GPS device, an auto control system, a head mounted unit, or a center fascia which may be embedded in or connected to the moving means 1000. The display apparatus 200 may be used as a display unit to display an image corresponding to one or more functions or status of the moving means 1000. The display apparatus 200 may be controlled by a controller of the moving means 100 to perform a function thereof.

FIG. 1 illustrates an example in which the user terminal device 100 is implemented as a mobile phone and the moving means 1000 is implemented as a car.

If a user of the user terminal device 100 opens a door of the moving means 1000 or gets in the moving means 1000, the user terminal device 100 may be connected to the display apparatus 200 for communication automatically or manually. For communication, various communication methods, such as WiFi, Bluetooth, IEEE, Zigbee, Near Field Communication (NFC), and USB interface, may be used.

If the user terminal device 100 connects to the display apparatus 200, the user terminal device 100 may provide various screens by utilizing the display apparatus 200. Therefore, various services based on personal information stored in the user terminal device 100 may be provided through the user terminal devices 100 or the display apparatus 200. Examples of personal information may be acquaintances' photos, names, telephone numbers, email addresses, postal address information, and schedule information.

Specifically, the user terminal device 100 may provide screen displayed on the user terminal apparatus 100 to the display apparatus 200 and share displayed screen with the display apparatus 200.

Further, if a specific application implements in the user terminal apparatus 100, the user terminal apparatus 100 may provide an implemented screen of the corresponding application to the display apparatus 200, and the display apparatus 200 may display the implemented screen thereon. Specifically, the user terminal device 100 displays prestored personal information. If one of the displayed personal information is selected, the user terminal device 100 implements an application program to use the selected personal information. Accordingly, the implement screen generated with the implemented application program may be displayed by using the display apparatus 200. The displayed personal information may include various information, for example, a contact list, schedule information, a user name, hobby, birthday data, etc. The implemented application program may be various programs, for example, a contact list managing program, a schedule managing program, a GPS program, and a screen displaying program.

Further, the user terminal device 100 may provide recorded personal information to the display apparatus 200, and the display apparatus 200 may create a screen using the provided personal information and then display the created screen.

Various embodiments regarding the above will be described below.

Figure 2:
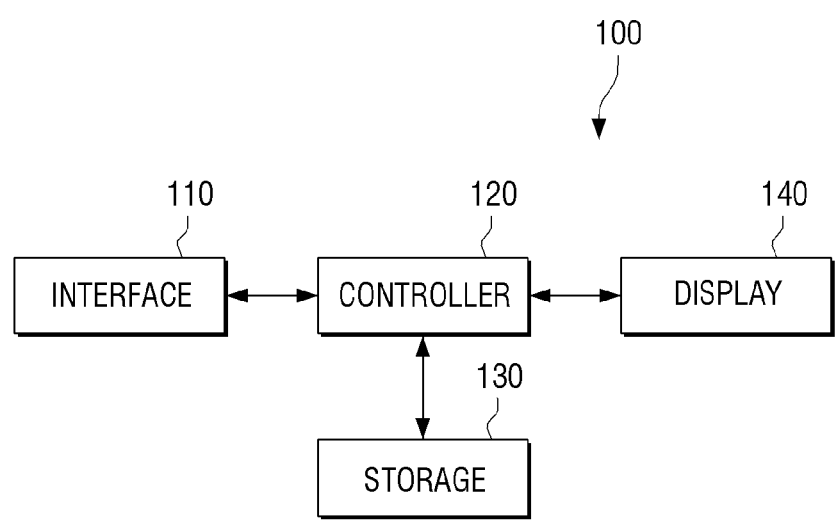
FIG. 2 is a block diagram illustrating a user terminal device according to an embodiment of the present general inventive concept.

FIG. 2 is a block diagram illustrating the user terminal device 100 of FIG. 1 according to an embodiment of the present general inventive concept. Referring to FIG. 2, the user terminal device 100 includes an interface 110, a controller 120, a storage 130, and a display 140.

The interface 110 connects to one or more of other various external devices including the display apparatus 200. As described above, the interface 110 may be implemented as at least one of various communication interfaces such as WiFi, Bluetooth, IEEE, Zigbee, NFC, or USB interface.

The storage 130 may store various data such as Operating System (0/S) to drive the user terminal device 100, applications, data inputted or established while implementing application, or contents.

The controller 120 may control one or more operations of the user terminal device 100 by using the programs stored in the storage 130. Further, if the user terminal apparatus 100 is connected to the display apparatus 200 via the interface 110, the controller 120 may access the display apparatus 200 and control one or more operations of the display apparatus 200.

The display 140 displays one or more screens according to controlling of the controller 120. Specifically, if a user input is perceived (received) in a locked state, the display 140 displays a locked screen, and if the user terminal apparatus 100 is unlocked according to an unlock operation of the locked screen, the display 140 displays a main screen. Further, if a user command to confirm one or more stored applications is inputted, the display 140 may convert the main screen to an application icon screen and display the application icon screen. Further, the display 140 may display an implement screen if a specific application is implemented by the controller 120.

Figure 3:
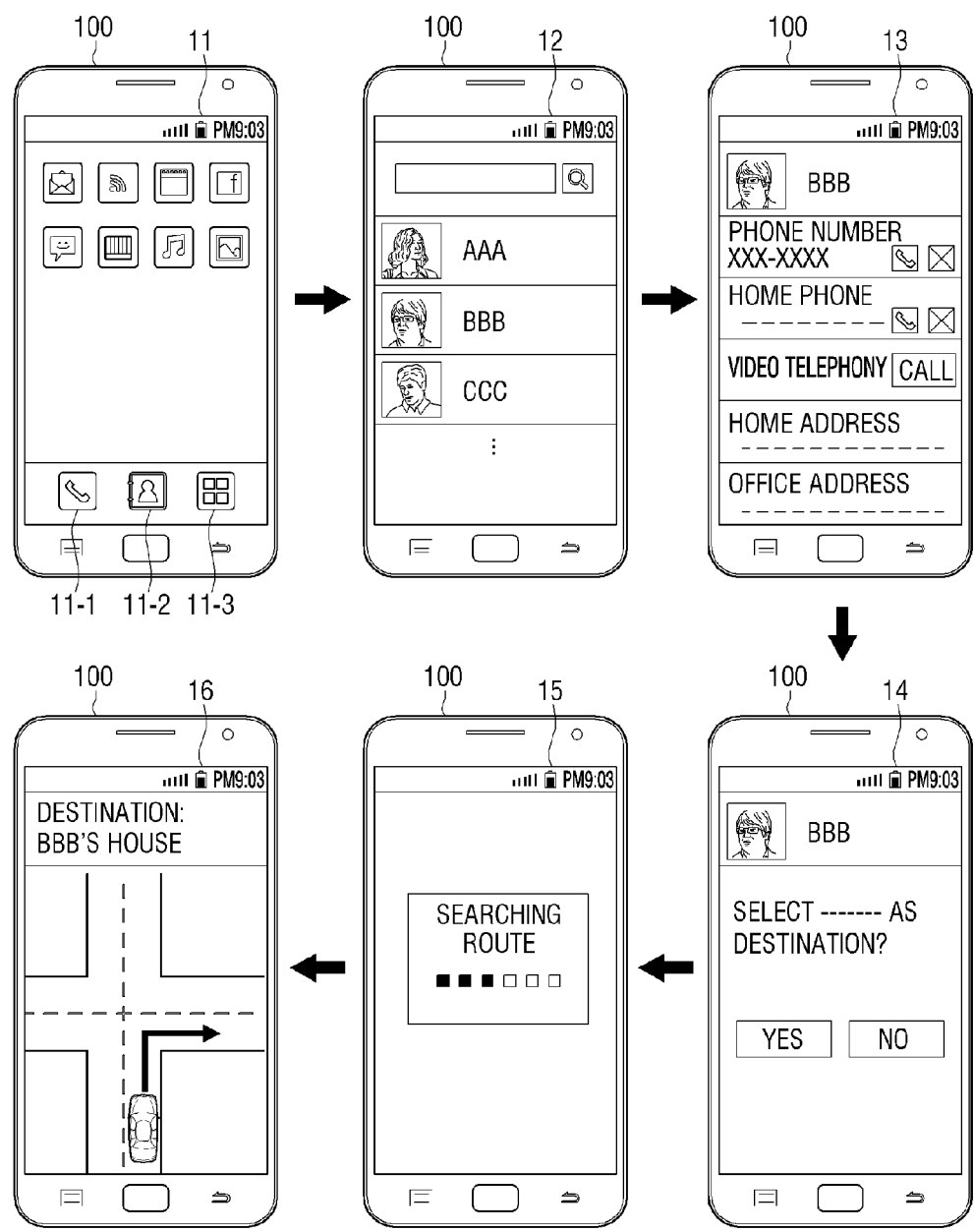
FIG. 3 illustrates an example of creating a screen in a process of providing a route guide service by using a contact list in the user terminal device of FIG. 2.

FIG. 3 is a diagram illustrating operations of a user terminal device according to an embodiment of the present general inventive concept. Referring to FIGS. 2 and 3, the display 140 displays an application icon screen 11 indicating various icons regarding installed applications.

On one area of the application icon screen 11, fixed menus 11-1, 11-2, 11-3 which are frequently used, are indicated. If a contact list menu 11-2 is selected from among the fixed menu 11-1, 11-2, 11-3, the user terminal device 100 displays a contact list 12. A plurality of cells is displayed in the contact list 12, and each cell displays photos or names of acquaintances registered on the storage 130 of the user terminal device 100.

If one cell is selected from the contact list 12, a detail information screen 13 is displayed to provide detail information of an acquaintance indicated by the selected cell. On the detail information screen 13, various personal information such as a mobile phone number, home telephone number, home address or office address besides photo or name may be displayed.

If address information is selected from such personal information, the controller 120 controls the display 140 to display route guide screen 16 to the selected address information. Specifically, if address information is selected, the controller 120 displays an inquiry screen 14 which asks whether or not to perform route guiding to the selected address information.

If YES is selected on the inquiry screen 14, the controller 120 displays a screen to search for a route 15 corresponding to the address information, generates the route guide screen 16 by using searching results, and displays the generated route guide screen 16.

Referring to FIG. 3, if address information recorded on the contact list is selected, the user terminal device 100 may provide route guide service by using the address information.

Meanwhile, as already explained above by referring to FIG. 1, if the user terminal device 100 connects to the display apparatus 200 mounted on the moving means 1000, the controller 120 of the user terminal device 100 may use the display apparatus 200 to display a screen corresponding to the route guide screen 16.

Figure 4:
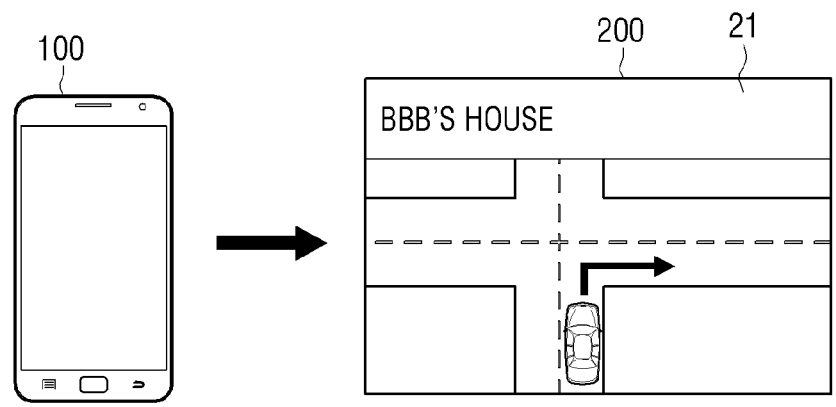
FIG. 4 illustrates an example of a route guide screen displayed on a display apparatus connected to a user terminal device.

FIG. 4 illustrates an example of the route guide screen 16 displayed by utilizing the display apparatus 200. Referring to FIG. 4, a route guide screen 21 is displayed on the display apparatus 200.

According to the embodiment, the route guide screen 21 may be generated in the user terminal device 100. In other words, if address information is selected from a contact list, the controller 120 implements a GPS program stored in the storage 130 and generates the route guide screen 16 or 21. The controller 120 may create and directly provide the generated route guide screen 21 as it is, to the display apparatus 200 via the interface 110, and the display apparatus 200 may display the generated route guide screen 21. The received route guide screen 21 may be reconstructed (modified) according to a size and a ratio of a width and a depth of the display apparatus 200 and displayed according to the reconstructed route guide screen 21.

According to the embodiment, the route guide screen 21 may be generated by the display apparatus 200. If address information is selected, the controller 120 transmits the selected address information to the display apparatus 200.

The display apparatus 200 implements a pre-stored GPS program, searches for one or more routes corresponding to the received address information, generates the route guide screen 21 using the searched routes, and displays the generated route guide screen 21.

Figure 5:
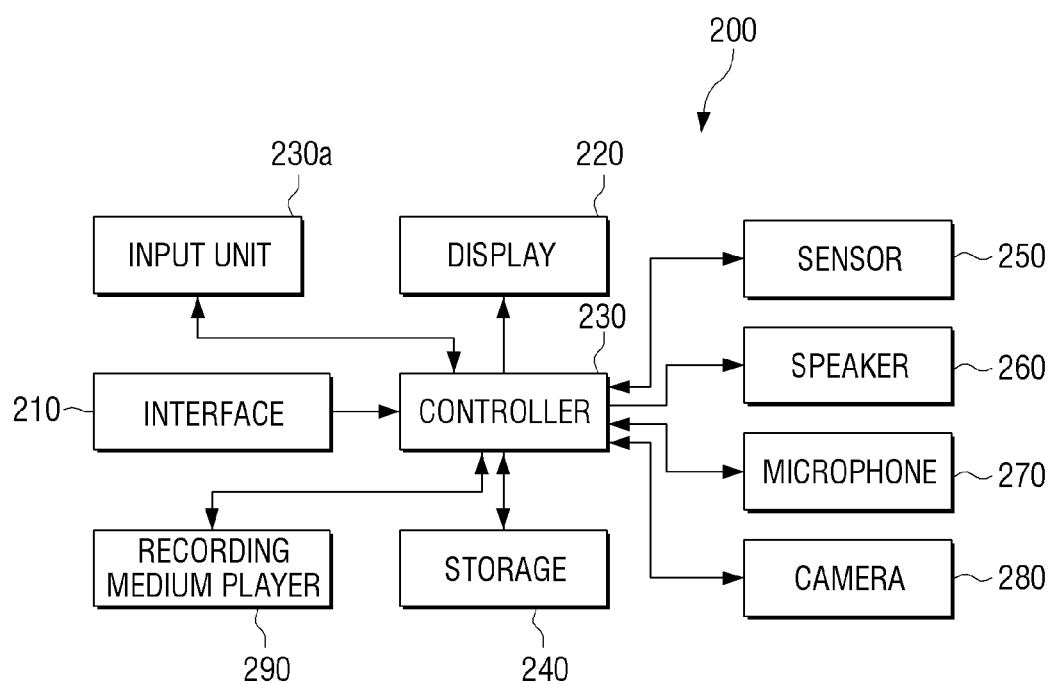
FIG. 5 is a block diagram illustrating display apparatus according to an embodiment of the present general inventive concept.

FIG. 5 is a block diagram illustrating the display apparatus 200 of FIG. 1 according to an embodiment of the present general inventive concept. Referring to FIG. 5, the display apparatus 200 includes an interface 210, a display 220, a controller 230, a storage 240, a sensor 250, a speaker 260, a microphone 270, a camera 280, and a recording medium player 290. The display apparatus 200 may include an input unit 230a to input a user command or data to be useable in operations of the display apparatus 200 and/or the moving means 1000. The input unit 230a and the display 220 may be formed as a single unit such as a touch panel to display an image and to receive a user input.

The interface 210 uses the above described various communication methods and is connected to the user terminal device 100 through a wired or wireless communication method.

The display 220 is a component which displays state of the moving means 1000, various messages or screens. The display 220 may be implemented as an LCD panel including an LCD panel and a back light (not illustrated).

The storage 240 stores various programs to implement functions of the display apparatus 200, information set by a user, or contents.

The sensor 250 senses user touches made with respect to the display 220. The sensor 250 may be implemented as a touch sensor embedded in the display 220.

The speaker 260 is a component which outputs various alarm sounds and audio signals, the micro phone 270 is a component which receives various sound signals pronounced by a user, and the camera 280 is a component which photographs interior or exterior of the moving means 1000 and generates an image corresponding to the photographed one to be displayed on the display 220.

The recording medium player 290 is a component which plays various contents recorded on various types of recording medium such as CD, MP3, DVD, or Blu-ray disk.

The controller 230 controls the respective elements illustrated in FIG. 5, and performs one or more general operations that can be supported by the display apparatus 200. Specifically, if a menu displayed on a screen of the display 220 is selected by a touch method or if one or more buttons formed within the moving means 100 are selected, the controller 230 performs a function corresponding to the selected menu or buttons. Additionally, if the display apparatus 200 supports a voice control mode or motion control mode, the controller 230 may perform an operation according to user voices inputted via the microphone 270 or according to user motions photographed at the camera 280.

For example, if a GPS menu is selected, the controller 230 generates an input screen to input a destination and displays the screen on the display 220. Further, if a command to play recording medium such as CD or MP3 file is inputted, the controller 230 controls the recording medium player 290 to output contents recorded on recording medium through the display 220 and/or the speaker 260.

As described above, if the user terminal device 100 is connected via the interface 210, the controller 230 may interoperate with the user terminal device 100, and provide one or more services using personal information stored in the user terminal device 100. The controller 230 may be a controller of the moving means 1000 to perform a function of one or more components or units of the moving means 1000 using the display apparatus 200.

Specifically, by referring to FIG. 4, address information selected from the contact list of the user terminal apparatus 100 may be utilized to generate a route guide screen, and the generated route guide screen may be displayed through the display 220.

Meanwhile, the display 220 may be implemented as a transparent display system.

Figure 6:
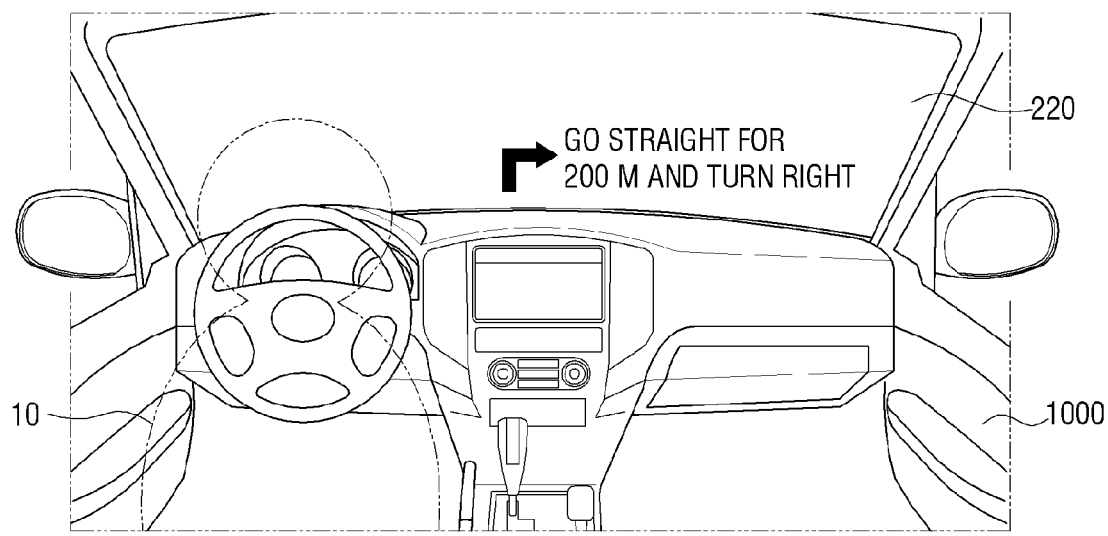
FIG. 6 illustrates an example of implementing a display apparatus as a transparent display system mounted on a moving means.

FIG. 6 illustrates an example of implementing the display 220 of FIG. 5 as a transparent display system. Specifically, the display 220 may be various types such as a transparent Liquid Crystal Display (LCD), transparent Thin-Film Electroluminescent Panel (TFEL), transparent OLED, or projection type. If implemented as the projection type, the display 220 may include a transparent screen, an optical device, and/or a light source device.

If the moving means 1000 is implemented as a car or vehicle, a front glass window may play a role of a transparent screen. The light source device utilizes various types of light sources such as a Vacuum Fluorescent Display (VFD), Cathode Ray Tube (CRT), or LED, and emits lights to display information. The optical device transmits and projects lights emitted from light source device to the transparent screen. The optical device may be implemented as a light guiding panel including at least one lens and at least one mirror. The light source device and the optical device may be implemented as one display module. Thus, the display module is arranged on a boundary area of up, down, left and right sides on a transparent screen and projects lights to the transparent screen. Thus, information is displayed on the transparent screen. Referring to FIG. 6, graphic images and texts for the route guidance may be displayed on the transparent screen.

Figure 7:
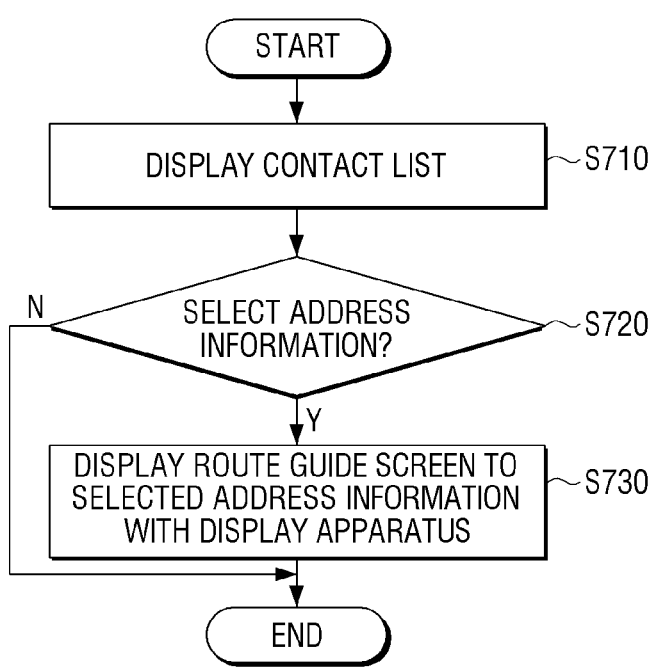
FIG. 7 is a flowchart illustrating a service providing method according to an embodiment of the present general inventive concept.

FIG. 7 is a flowchart illustrating a service providing method according to an embodiment of the present general inventive concept. Referring to FIGS. 1 and 7, the user terminal device 100 is connected to the display apparatus 200 mounted on the moving means 1000 and provides a route guide service.

Specifically, the user terminal device 100 displays a pre-stored contact list at operation S710. The contact list may be displayed as the one illustrated in FIG. 3.

A user may confirm respective personal information recorded on the displayed contact list, and perform one or more jobs of calling, messaging, and mailing. Further, a user may select address information in the contact list. If the address information is selected at operation S720, route guiding may be performed at operation S730 to display a route guide screen corresponding to the selected address information by using the display apparatus 200.

Figure 8:
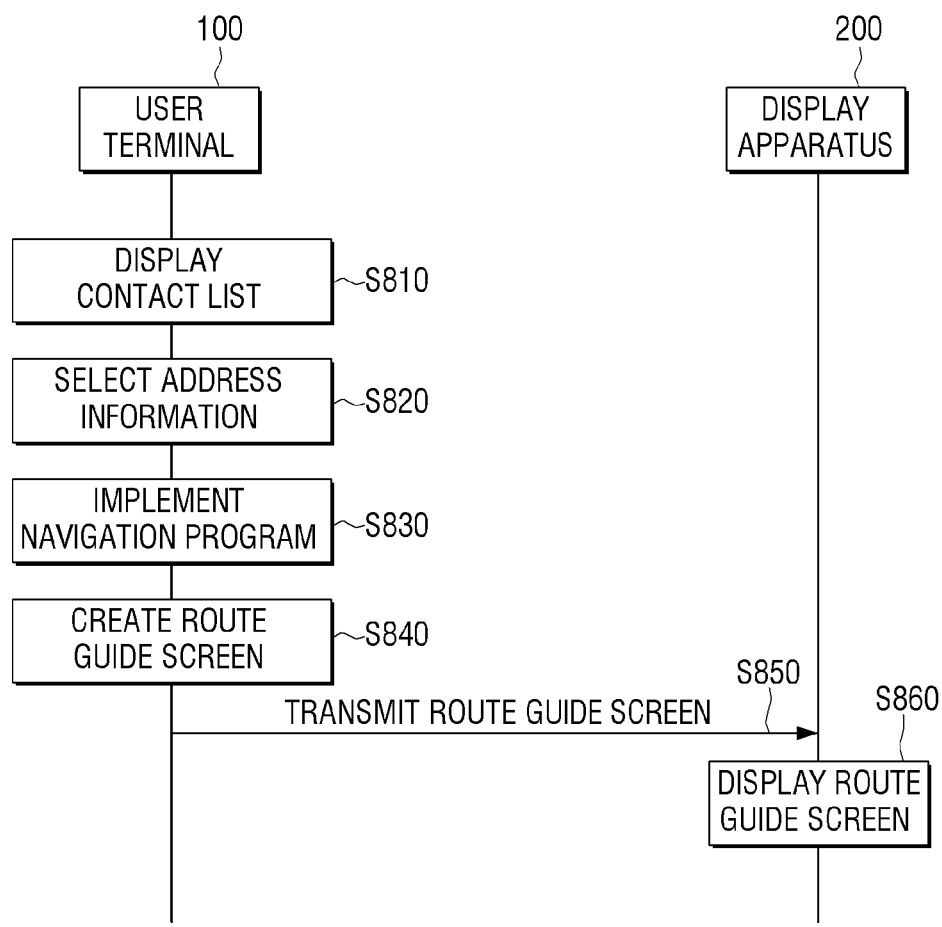
FIGS. 8 and 9 are timing diagrams illustrating service providing methods according to various embodiments of the present general inventive concept.
Figure 9:
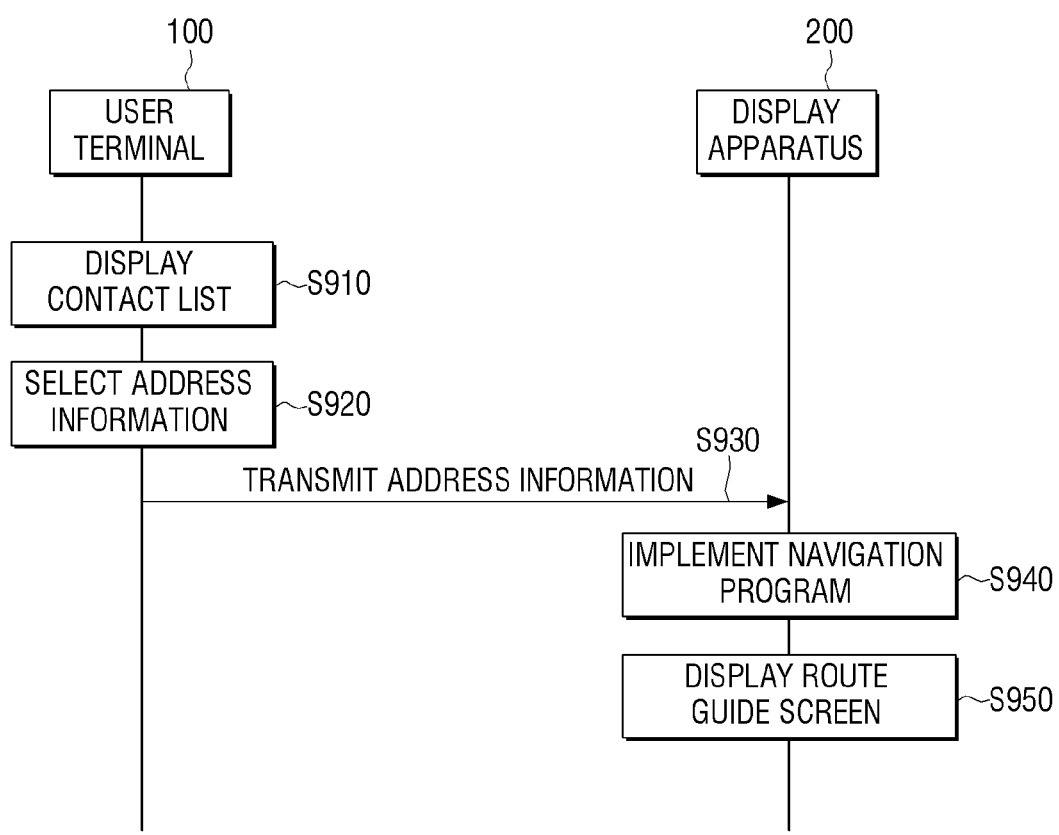

FIGS. 8 and 9 are diagrams illustrating detailed operations between a user terminal device 100 and a display apparatus 200 to provide a route guide service.

First, referring to FIGS. 1, 7, and 8, the user terminal device 100 displays a contact list at operation S810. If a user selects address information from the contact list at operation S820, the user terminal device 100 implements a GPS program at operation S830. The user terminal apparatus 100 generates a route guide screen according to the GPS program at operation S840. The user terminal device 100 transmits the generated route guide screen to the display apparatus 200 at operation S850.

The display apparatus 200 can immediately display the route guide screen received from the user terminal device 100 at operation S860. In this case, the display apparatus 200 may scale the route guide screen to the display size or modify a layout according to a ratio of a width and a depth regarding the display 220, reconstruct a route guide screen, and display the reconstructed screen thereon.

FIG. 9 illustrates a route guide service providing method according to an embodiment of the present general inventive concept. Referring to FIGS. 1, 7, and 9, while displaying a contact list at operation S910, if address information is selected at operation S920, the user terminal device 100 transmits the selected address information to the display apparatus 200 at S930.

If the selected address information is received, the display apparatus 200 implements a GPS program at operation S940. The display apparatus 200 inputs the received address information as a destination, searches for one or more routes according to the destination, and displays a route guide screen at operation S950.

Meanwhile, according to an embodiment, the user terminal device 100 may be connected to at least one of external devices to communicate with each other according to a wired or wireless communication method, utilize personal information of the connected external device, and thus, further enhance a route guide service according to the personal information of the connected external device.

Specifically, the controller 120 of the user terminal device 100 may automatically search for a current position of one or more acquaintances registered on the contact list and additionally mark a position of the respective acquaintances on the route guide screen if acquaintances are located around the routes which are currently displayed on the route guide screen.

Figure 10:
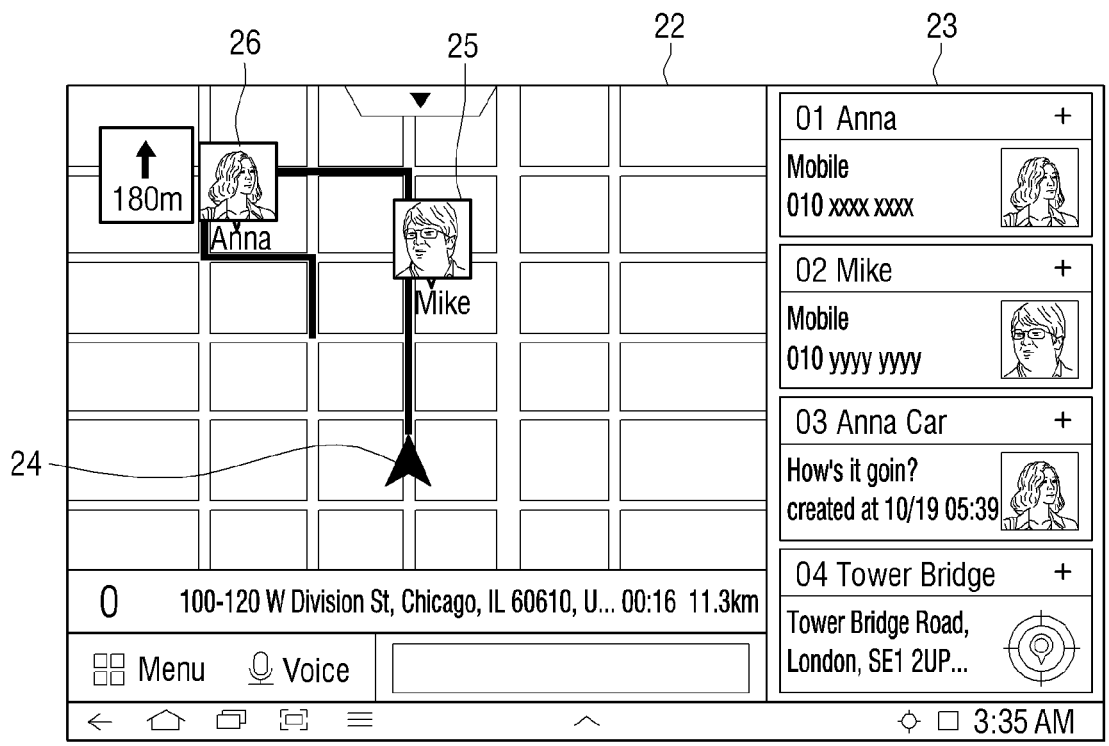
FIG. 10 illustrates a route guide screen displayed on a display apparatus.

FIG. 10 illustrates an example of a route guide screen which one or more acquaintances' positions are additionally indicated. Referring to FIG. 10, besides a route guide area 22 on the route guide screen, an information area 23 regarding the one or more acquaintances whose positions are indicated together. On the route guide area 22, a current position 24 of a user and one or more future routes are displayed on a map of the route guide screen. A user may select at least one from the information area 23. If one or more of acquaintances are selected, positions of the selected acquaintances are indicated on the route guide area 22. In this case, information 25, 26 such as images or names regarding the selected acquaintances may be displayed on the route guide area 22.

FIG. 10 illustrates the route guide screen displayed on the display apparatus 200. However, if the user terminal device 100 is disconnected from the display apparatus 200, the route guide screen of FIG. 10 may be displayed on the user terminal device 100. Thus, a route guide service according to the above embodiments may be provided by the user terminal device 100 as its own function.

Meanwhile, according to an embodiment, the user terminal device 100 may provide a service by utilizing schedule information among personal information.

Figure 11:
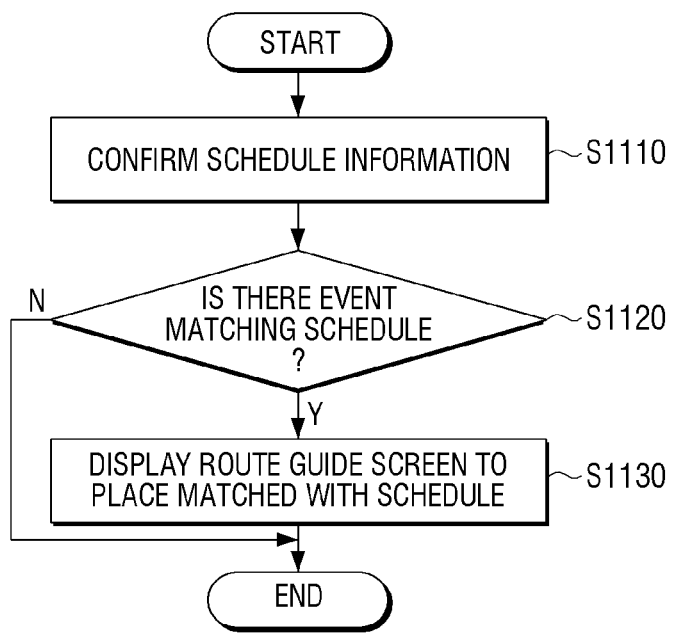
FIG. 11 is a flowchart illustrating a service providing method according to an embodiment of the present general inventive concept.

FIG. 11 is a flowchart illustrating a service providing method using schedule information. Referring to FIGS. 1, 2, and 11, the controller 120 of the user terminal device 100 confirms schedule information stored in the storage 130 at operation S1110. Confirming schedule information may repeat at a preset time period, or may be performed if the user terminal device 100 turns on or if a user command to confirm a schedule is inputted.

The controller 120 determines whether an event matching the schedule information occurs at operation S1120. Specifically, when it is a date or time as recorded on the schedule information, the controller 120 determines that the event matching the schedule information occurs.

If an event is determined to occur, the controller 120 displays a route guide screen to a place matching the event at operation S1130.

Meanwhile, if an event matching the schedule information occurs, the controller 120 may search for one or more external devices storing the overlapped schedule information among the external devices connected to the user terminal device 100.

The controller 120 may display a user list of the searched external devices. A user may select another user included in the list. If one or more users are selected from the list, the controller 120 may regenerate a route guide screen by updating positions of the selected users and display the regenerated route guide screen.

If the user terminal device 100 is connected to the display apparatus 200, the above described route guide screen may be displayed on the display apparatus 200. Further, a screen which displays the schedule information may be provided and displayed on the display apparatus 200.

Figure 12:
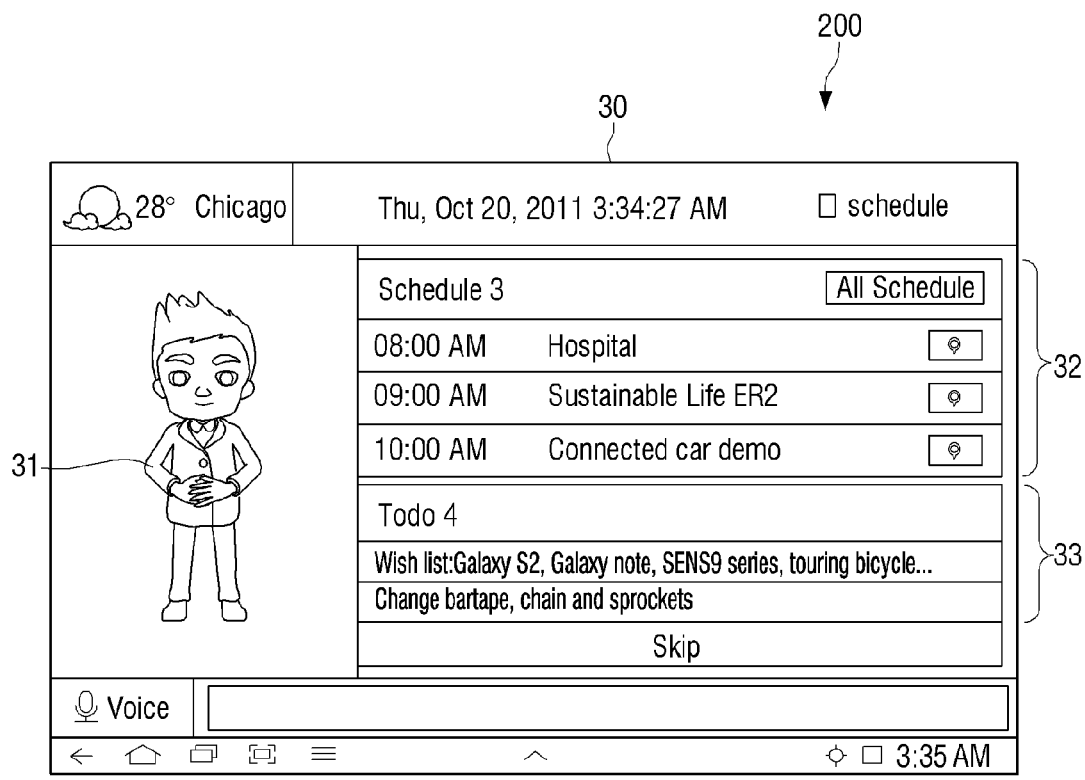
FIG. 12 illustrates a route guide screen displayed on a display apparatus.

FIG. 12 is an example of an operation of creating a screen in the display apparatus 200 which displays schedule information. Referring to FIG. 12, a schedule information display screen 30 displays a miniature image 31 to provide a visual enjoyment, time-based schedule information 32, and a to-do list 33 briefing one or more jobs.

If a user selects the schedule information 32 or to-do list 33 on the schedule information display screen 30, the selected information may be displayed with more details. For example, if the schedule information 32 is selected, detail information such as a time, a place, or one or more scheduled plans may be displayed.

Figure 13:
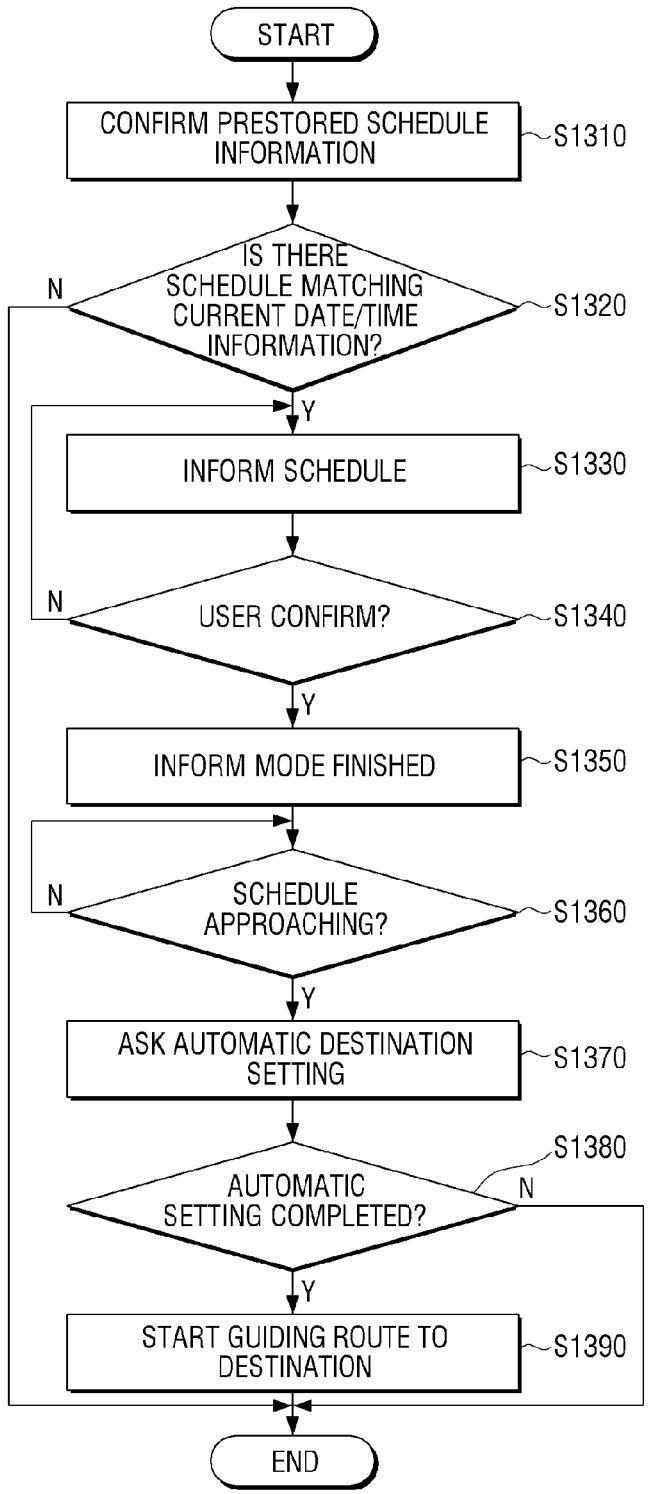
FIG. 13 is a flowchart illustrating a method of providing a route guide service by using schedule information.

FIG. 13 is a flowchart illustrating a detailed process of a service providing method using schedule information. Referring to FIGS. 1, 2 and 13, the user terminal device 100 confirms pre-stored schedule information at operation S1310. Accordingly, the user terminal device 100 determines whether there is a plan matching current schedule information is stored at operation S1320. The current schedule information may be generated based on the schedule information received from a station (or satellite) of the Global Positioning System (GPS).

As a result of determining, if there is a plan matching the current schedule information, a message to inform the plan is outputted at operation S1330. Such a message may be displayed on a display formed on the user terminal device 100 or on the display apparatus 200 if the user terminal device 100 is connected to the display apparatus 200.

The user terminal device 100 determines that a user confirms a message at operation S1340 if a menu to finish a message display is selected after displaying the message or if a specific time elapses, and finishes an informing state and thus finishes displaying the message at operation S1350. Otherwise, a user may mark (or select) an icon to inform a schedule on one side of a screen, and keep the icon on the display until the user touches the icon and confirms the schedule information.

Meanwhile, if determining that a time set in a schedule is fast approaching at operation S1360, the user terminal device 100 may output a message asking whether to automatically establish a place set in the schedule as a destination at operation S1370.

Therefore, if a confirm button is pushed in response to the above message, a destination is automatically established at operation S1380, and a route guide to destination begins automatically at operation S1390.

Figure 14:
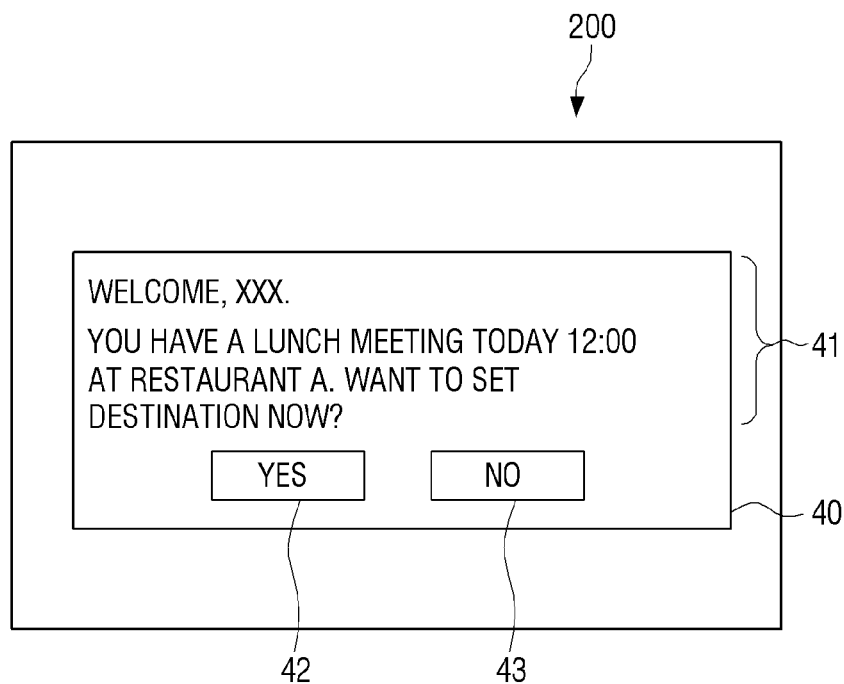
FIG. 14 illustrates a schedule information screen to inform schedule information.

FIG. 14 illustrates an example of an operation of creating a screen in a display apparatus to perform a route guide by utilizing a destination established in schedule information.

Referring to FIGS. 1, 2, and 14, the display apparatus 200 displays a message 40 asking whether to automatically establish a destination. The message 40 includes a display area 41 to display one or more texts such as schedule information, place information where schedule is done, and text question asking whether to establish the recorded place as a destination, and menu areas 42, 43 to determine automatic setting of the destination.

The above describes the embodiment of a method to display and touch visual messages; however, messages may be generated in voice and outputted through a speaker, and a user selection may be captured by other various methods such as perceiving motion or inputting voices.

Further, as described above, after a destination is automatically established by using a message of FIG. 14, if one or more other acquaintances have the same schedule, current positions of the acquaintances may be displayed on the route guide screen.

Figure 15:
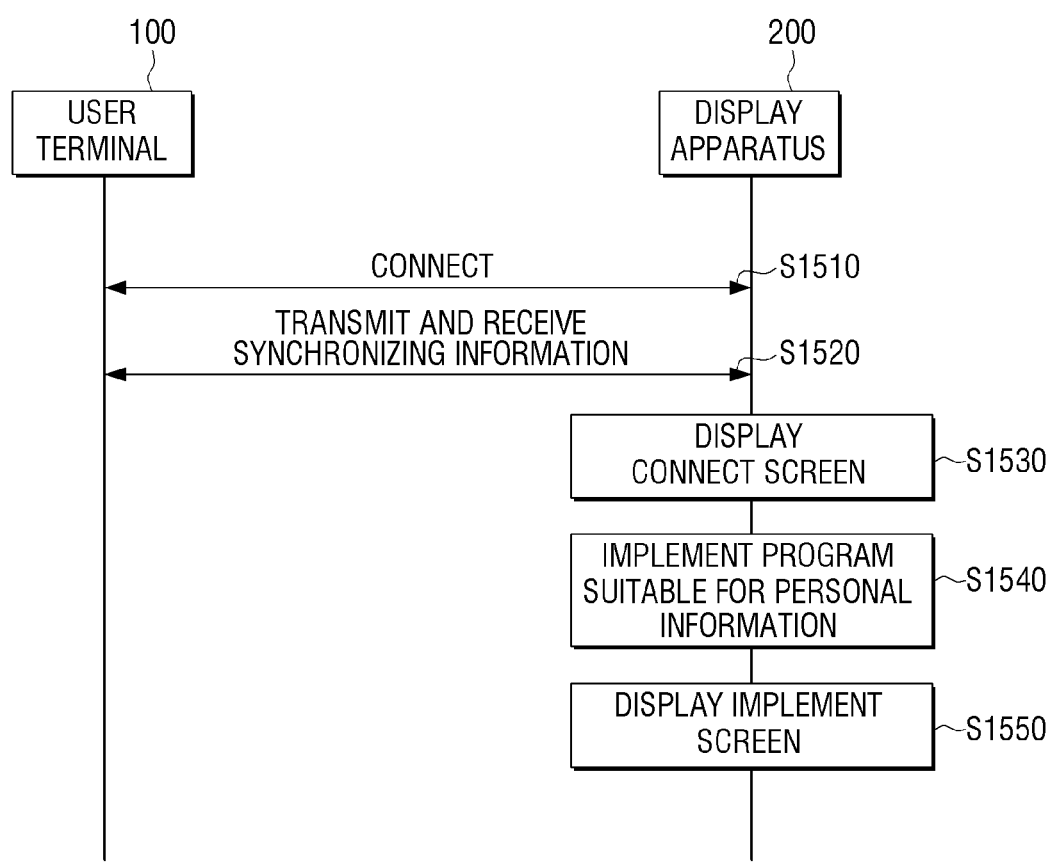
FIG. 15 is a timing diagram illustrating a service providing method according to an embodiment of the present general inventive concept.

FIG. 15 is a flowchart illustrating an operation between a user terminal device and a display apparatus according to an embodiment of the present general inventive concept.

Referring to FIGS. 1 and 15, if the user terminal device 100 and the display apparatus 200 are connected to each other at operation S1510, synchronizing information is transmitted and received at S1520. Synchronizing information transmitted from the user terminal device 100 may include various personal information such as a telephone number, user name, schedule, to do, alarm, weather, short message service (SMS), receiving information, and mailing information. Synchronizing information transmitted from the display apparatus 200 may include various moving means-related information such as a driving distance of the moving means 1000, driving time, driving distance per liter, $CO_2$ consumption, tire air pressure, fuel, engine oil, or battery.

While transmitting and receiving synchronizing information between the user terminal device 100 and the display apparatus 200 connected to each other as illustrated in in FIG. 15, mutual recognition may be performed. Specifically, the user terminal device 100 and the display apparatus 200 may utilize informed key algorithms or secret key algorithms stored in each, generate a media access control (MAC) address, and transmit to each other. After receiving the MAC address, both devices compare the generated MAC address with the received MAC address and complete recognition if they are uniform or same.

The display apparatus 200 displays a connection screen at operation S1530 if connected to the user terminal device 100. The connection screen may include various information such as a user name, schedule, whether to establish destination, or weather.

The display apparatus 200 implements one or more programs necessary for personal information included in synchronizing information transmitted from the user terminal device 100 at operation S1540. Accordingly, an implement screen of such programs is displayed at operation S1550.

Such programs to be used may be various types of programs such as a GPS program, schedule managing program, or alarm program. As a result, by connecting the user terminal device 100 and the display apparatus 200, every screen of the user terminal device 100 may be shared with the display apparatus 200.

Figure 16:
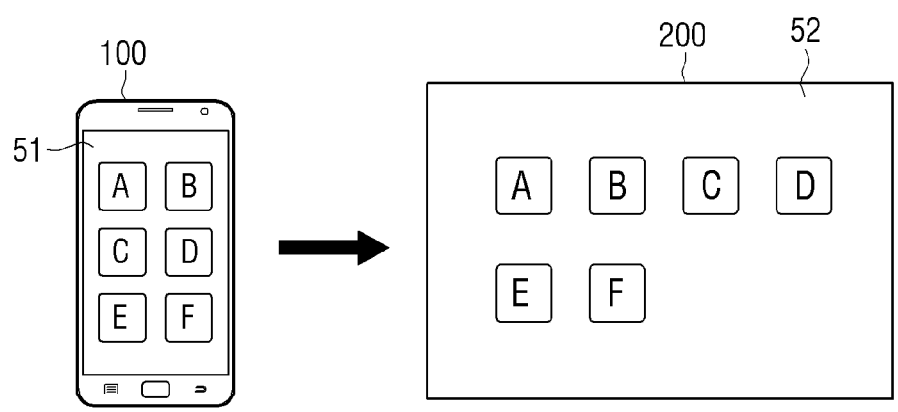
FIG. 16 illustrates a user terminal device and a display apparatus sharing screen by a method of FIG. 15.

FIG. 16 illustrates an example of an operation of creating a screen shared with the user terminal device 100 and the display apparatus 200. Referring to FIG. 16, the user terminal device 100 displays a screen 51 indicating one or more icons corresponding to installed applications and the display apparatus 200 also displays a screen 52 indicating the same icons. However, because a ratio of a width and a depth regarding a display mounted on the display apparatus 200 is different from a ratio of a width and a depth regarding a display mounted on the user terminal device 100, an icon indicating position and a layout on the screen 52 of the display apparatus 200 may be created or modified differently from those on the screen 51 of the user terminal device 100.

If an icon is selected on a screen of the display apparatus 200, the display apparatus 200 transmits information regarding the selected icon to the user terminal device 100. Accordingly, the user terminal device 100 implements an application corresponding to the selected icon and transmits an implement screen to the display apparatus 200. Thus, the display apparatus 200 displays the implement screen.

Figure 17:
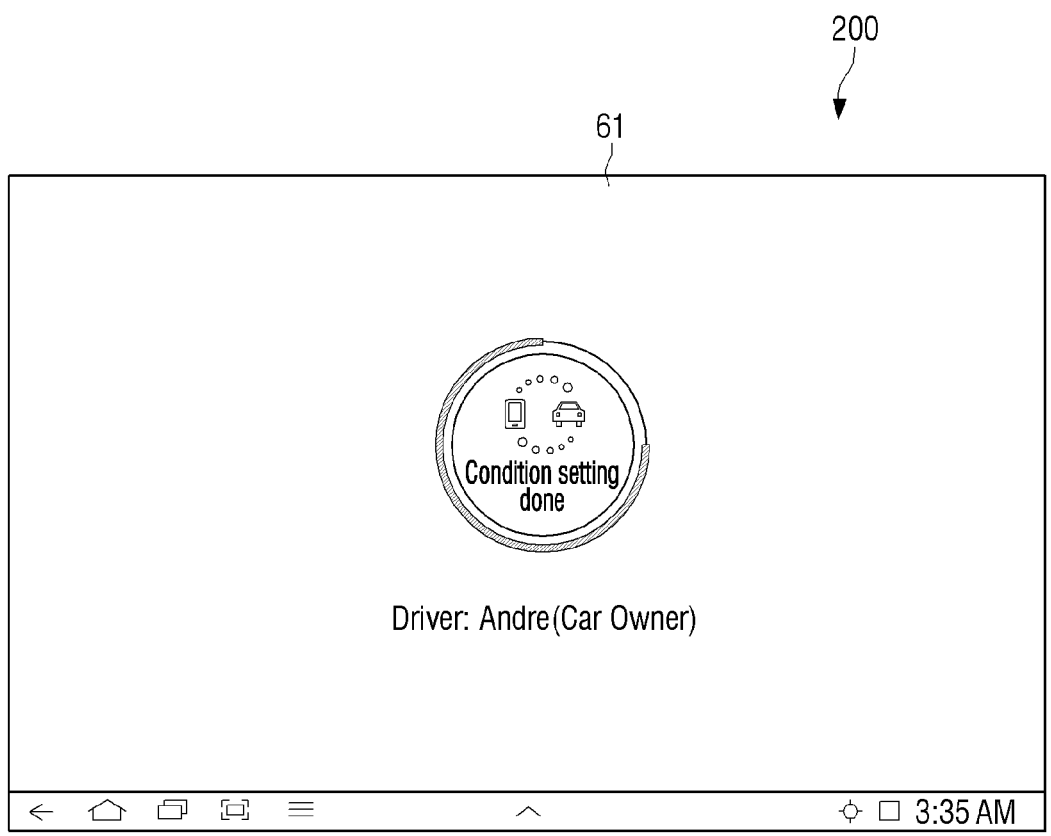
FIG. 17 illustrates a screen of a display apparatus connected to a user terminal device.

FIG. 17 illustrates an example of a brief screen 61 to be displayed on the display apparatus 200 connected to the user terminal device 100. Referring to FIG. 17, the brief screen 61 may display various objects such as an image representing a currently connected state to the user terminal device 100, a user name, or a last connect date.

Figure 18:
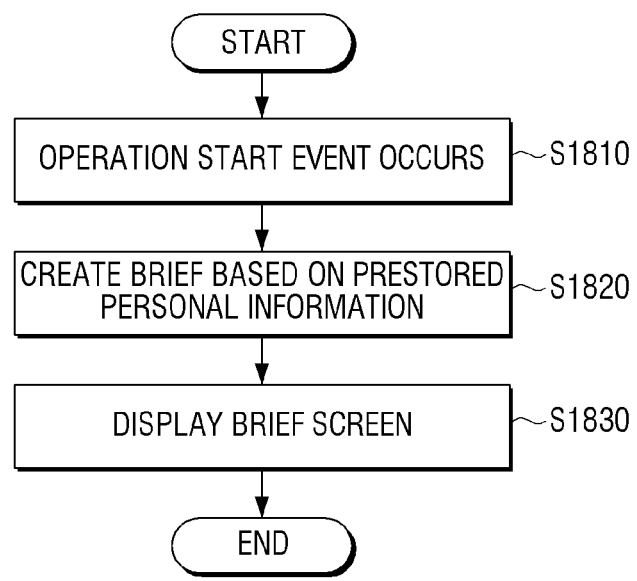
FIG. 18 is a flowchart illustrating a service providing method according to an embodiment of the present general inventive concept.

FIG. 18 is a flowchart illustrating a service providing method according to an embodiment of the present general inventive concept. FIG. 18 illustrates a method of providing a brief service based on personal information.

Referring to FIG. 18, if an operation initiating event occurs at operation S1810, a brief screen is created based on personal information stored in the user terminal device 100 at operation S1820. On the brief screen, various personal information, e.g., today's weather, user schedule, or special notes, is combined with default objects and displayed. The display apparatus 200 displays the created brief screen at operation S1830.

The operation initiating event may include various events such as: an event to turn on the user terminal device 100 or the display apparatus 200, an event to occur periodically at a setting time such as 12:00 afternoon, an event to occur at a specific time point, an event to connect communication between the user terminal device 100 and the display apparatus 200, or an event to open one or more doors of the moving means 1000 with a smart key which is implemented as the user terminal device 100. If implemented as a smart key, the user terminal device 100 may include a near field communication (NFC) module. Therefore, if tagging with a door lock system of the moving means 1000, various synchronizing information such as personal information may be provided to the door lock system with the NFC method, and the door lock system may transmit the information to the display apparatus 200.

Figure 19:
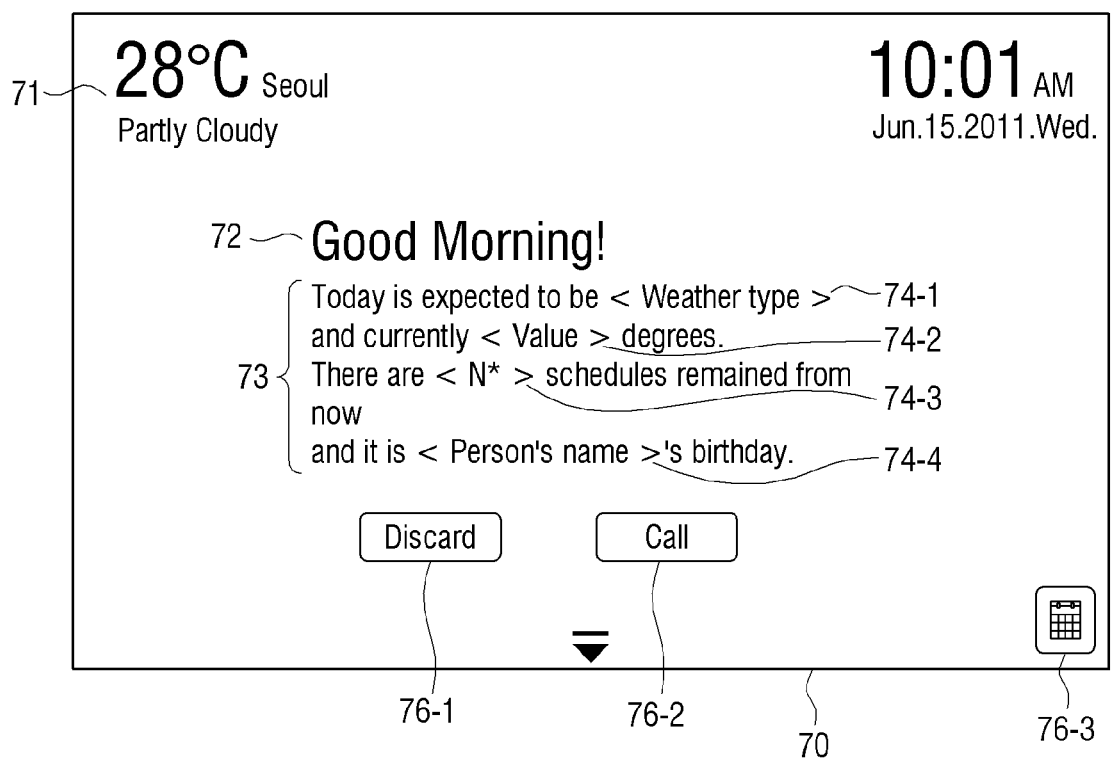
FIGS. 19 to 25 are diagrams illustrating various screen displayed on a display apparatus according to an embodiment of FIG. 18.

FIG. 19 illustrates an example of a brief screen 70 displayed according to the method of FIG. 18. Referring to FIG. 19, a mode to display the brief screen 70 may be displayed as one or more terms such as a welcome mode, a brief mode or an initial mode; however, the term is used as the welcome mode in this description, for example. On the brief screen 70 of FIG. 19 are arranged an information display area 71 indicating information such as weather, temperature, local area, time, or date, a first context area 72, a second context area 73 and a plurality of menus 76-1, 76-2, and 76-3.

The first context area 72 may display a hello (greeting) message to welcome a user connection. The hello message may be different or variable depending on a connection time. For example, hello messages displayed on the first context area 72 may be 'Good Morning!' from 12:00 am to 11:59 am, 'Good Afternoon!' from 12:00 pm to 5:59 pm, and 'Good Evening!' from 6:00 pm to 11:59 pm. Used language may be set according to user nationality or information established by a user. If used language does not have the hello message per time, a most frequently used hello message may be expressed.

On the second context area 73, various personal information and fixed texts are combined and displayed. Referring to FIG. 19, a number of parameter values, for example, first to fourth parameter values, 74-1, 74-2, 74-3, and 74-4, regarding a plurality of personal information may be combined and displayed. Specifically, the parameter values may include the first parameter value 74-1 indicating a weather type of a current local area, the second parameter value 74-2 indicating a temperature of a current local area, the third parameter value 74-3 indicating the number of today's schedules, and a fourth parameter value 74-4 indicating one or more names of acquaintances having birthday. The first to the fourth parameter values 74-1, 74-2, 74-3, and 74-4 are variable according to personal information in each date, and fixed texts are maintained as they are. For example, if it is cloudy today and 28° C., there are 2 schedules, and AAA has a birthday, on the second context area 73 of the brief screen 70, the following text is displayed: "Today is expected to be cloudy and currently 28 degrees. There are 2 schedules remained from now and it is AAA's birthday." Therefore, a service to brief for one day may be provided on the brief screen 70.

Since the above parameter values are generated based on the personal information, corresponding information may not be displayed if there is no personal information corresponding to a specific day. Additionally, if there is other personal information, another text may be displayed on the second context area 73. For example, if some jobs should be done on a specific day, if there are missing calls, or if there are received messages, texts to inform the above information may be also displayed.

A user may select one from a plurality of menus, for example, first to third menus 76-1, 76-2, and 76-3, displayed on the brief screen 70. If menu is selected, the user terminal device 100 may perform operation corresponding to the selected menu. For example, the first menu 76-1 is a menu to discard texts displayed on the brief screen 70 and complete the welcome mode. The second menu 76-2 is a menu to call a personal indicated on the fourth parameter value 74-4. The third menu 76-3 is a menu to display a today's schedule screen which organizes today's schedule in detail.

Meanwhile, although not illustrated in FIG. 19, if there are missing calls or new messages are received, texts to inform the fact may be included on the brief screen 70.

Figure 20:
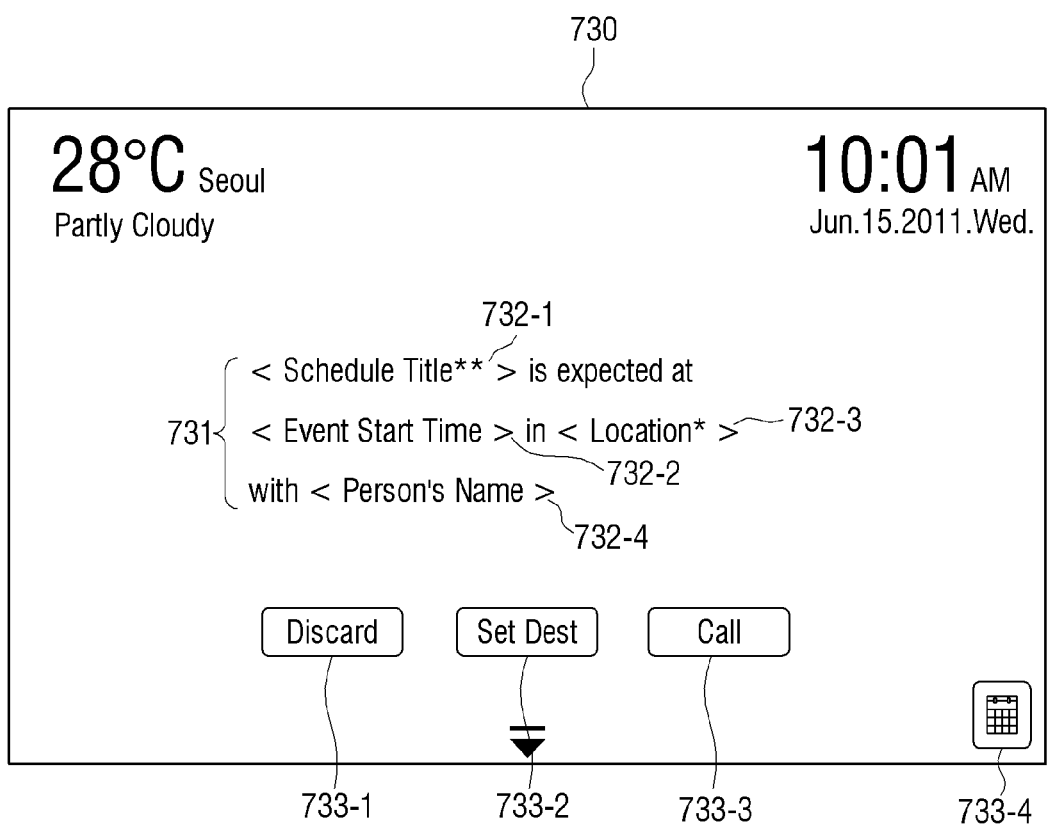

FIG. 20 illustrates an example of an operation of creating a brief screen 730. Specifically, FIG. 20 illustrates a screen to display a today's schedule with more detail. According to embodiments, the brief screen 730 of FIG. 20 may be displayed if the second context area 73 is selected on the brief screen 70 of FIG. 19 or if a user converts a screen to a next page. Further, according to another embodiment, the brief screen 730 of FIG. 20 may be displayed initially without displaying the brief screen 70 of FIG. 19.

Referring to FIG. 20, on the brief screen 730, a context area 731 and a plurality of menus 733-1, 733-2, 733-3, and 733-4 are displayed. On an upper side of the brief screen 730, information, such as a current time, date, temperature, weather, or local information, may be displayed.

The context area 731 displays, in combination with fixed texts, the first parameter value 732-1 indicating a schedule title matching a current date, the second parameter value 732-2 indicating a schedule begin time 732-2, the third parameter value indicating a place of the schedule 732-3, and the fourth parameter value 732-4 indicating one or more names of persons who will meet on the schedule. For example, if stored schedule information informs that an AAA's birthday party will begin at 6:00 p.m. at a BBB restaurant and the user will join the party with another acquaintance, CCC, a phrase such as "AAA's birthday party is expected at 6:00 pm in BBB restaurant with CCC" is displayed on the context area 731 of the brief screen 730.

If there is no schedule title, the first parameter value 732-1 may indicate a general expressing text such as "Your next schedule." Further, the second parameter value 732-2 may be indicated in a time format such as a format of hour:minute am/pm. The third parameter value 732-3 may indicate a place of a schedule, such as a building name, shop name, or address. Such a place of the schedule may be displayed as inputted when recording schedule information, as added with the address information based on a user input data or command inputted by a user, or as deleted according to a user input. For example, if a user records a whole address but a size of a text field is limited, short address information such as a road name or street address may be displayed. If the text field has a larger size, a city area or district name may be also displayed together with the road name or street name.

A user may select a plurality of menus 733-1, 733-2, 733-3, and 733-4 displayed on the brief screen 730. The first menu 733-1 is a menu to complete or discard the brief screen 730 currently displayed. The second menu 733-2 is a menu to automatically implement a GPS program with a place of a schedule indicated by the third parameter value 732-3 as a destination. In other words, like an example of FIG. 11, a route guide service may be automatically implemented based on the schedule information. The third menu 733-3 is a menu to directly call one or more participants indicated by the fourth parameter value 732-4. If a plurality of participants are registered on the schedule, the call may be connected to the most frequently-contacted persons, the most recently contacted person, the first person on the invitation list, or the person registered as a representative. Meanwhile, the third menu 733-3 is a menu which can be performed only if telephone number information of participants is recorded on the contact list or if telephone numbers of the participants are stored together when storing the schedule information. In an inactive mode, the third menu 733-3 may be displayed as the inactivated state or excluded from the displaying brief screen 730. The fourth menu 733-4 is a menu to display a today's schedule screen. Examples of creating the today's schedule screen will be further explained below.

Meanwhile, as explained above with reference to FIG. 19, a text displayed on the context area 730 may be different according to stored schedule information. For example, if a destination is not stored, "in <Location>" part is deleted or not displayed, if a time is not stored, "at <Event Start Time>" part is deleted or not displayed, and if information regarding participants is not stored, "with <Person's Name>" is deleted or not displayed.

As described above, if the third menu 76-3 of FIG. 19 or the third menu 733-4 of FIG. 20 is selected, a today's schedule screen to further describe a today's schedule in detail is displayed.

Figure 21:
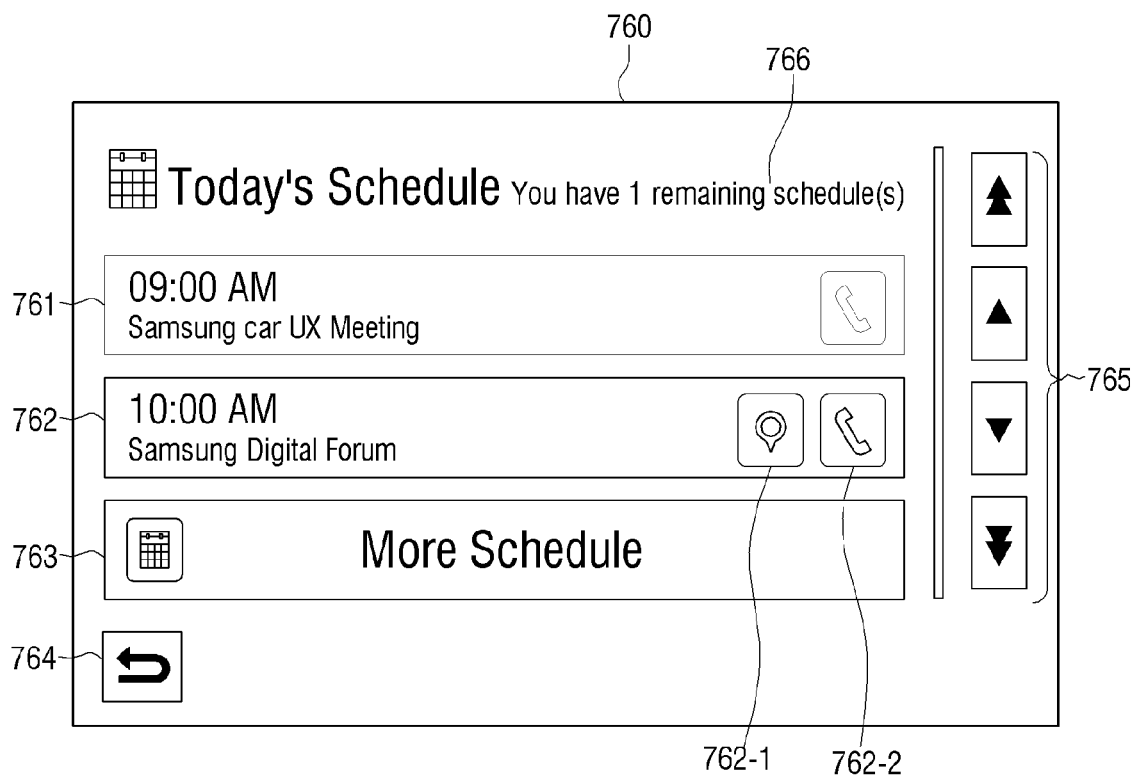

FIG. 21 illustrates an example of an operation of creating a today's schedule screen 760. Referring to FIG. 21, the today's schedule screen 760 displays a today's schedule list 761, 762, a menu 763 to confirm another day schedule, a menu 764 to go back to a brief screen like the brief screen 70 or 730 illustrated in FIG. 19 or FIG. 20, a button 765 to perform a menu scrawl, and an expression 766 to indicate a number of one or more remained schedules at a current time.

On the list 761 and 762, a cell 761 of a past schedule based on a current time is displayed with a first brightness, and cell 762 of remained schedule is displayed according to a second brightness brighter than the first brightness. Information of each schedule included in a list may be provided from an application to manage a schedule.

If a cell is selected from the list, a screen moves to a detail confirm screen regarding the schedule. While the moving means 1000 mounting the display apparatus 200 connected with the user terminal device 100 is driving, selecting a cell may be inactivated so as not to be performed.

A plurality of menus 762-1 and 762-2 may be displayed within the cell 762. The first menu 762-1 is a menu to automatically establish place set in the schedule as a destination and provide a route guide service. The first menu 762-1 may be displayed only if there is place information of the schedule. In other words, the first cell 761 does not display a menu to establish a destination while the second cell 762 displays a corresponding menu.

The second menu 762-2 is a menu to connect a call to a representative phone number of the participants on the schedule. If a plurality of participants are registered on the schedule, a call can be connected to a most frequently contacted person, a most recently contacted person, a first person on the invitation list, or a person registered as the representative.

To confirm another day schedule, a user may select an add schedule menu 763. If the add schedule menu 763 is selected, data regarding another day schedule may be provided from a calendar application of the user terminal device 100 and a schedule screen may be created.

Further, a user may convert a screen to a previous screen by selecting a menu 764, or scrawl a today's schedule screen 760 up and down or left and right by utilizing the button 765 to perform the menu scrawling. Further, through an expression 766, a user can check the number of one or more remained schedules at a current time at once.

Each menu or button of FIG. 21 may be inactivated for user safety if the moving means 1000 is driving.

Figure 22:
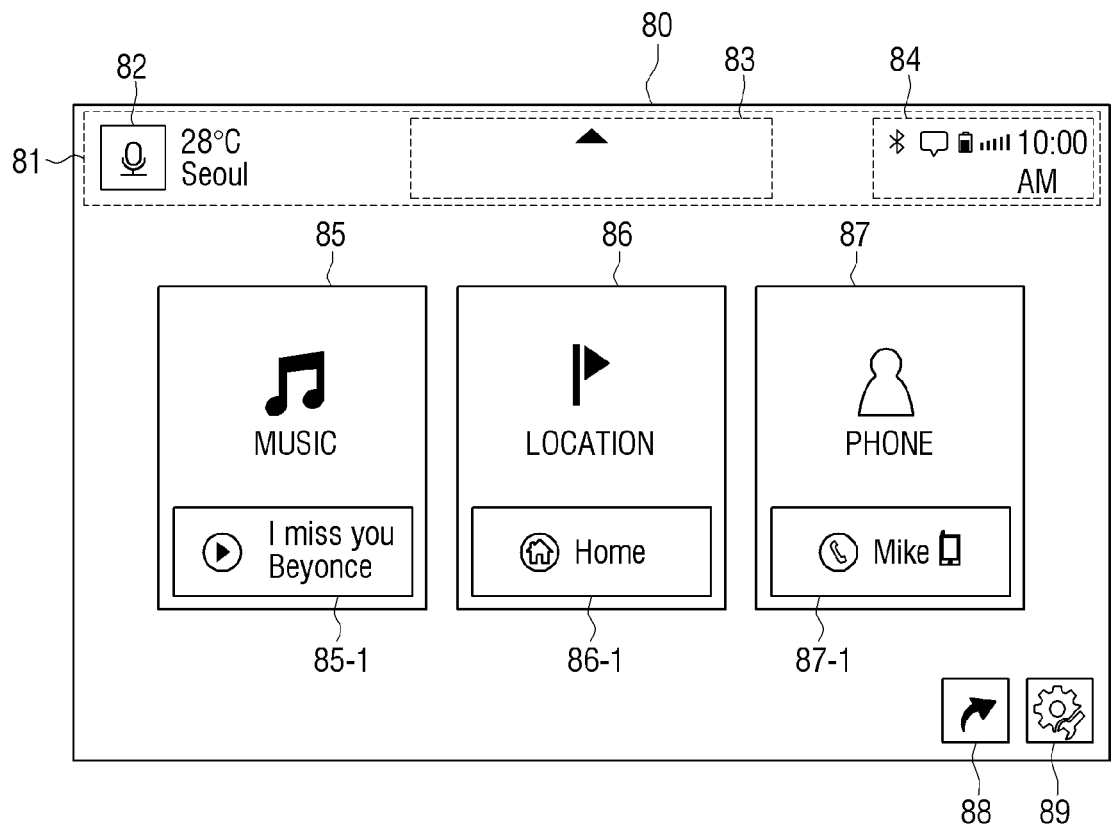

FIG. 22 illustrates an example of an operation of creating a screen displayed when a welcome mode completes or is discarded and a normal mode begins. For convenient explanations, a screen of FIG. 22 will be referred to as a home screen 80.

An upper area 81 of the home screen 80 displays a voice input button 82, a button 83 to go back information such as a current position, weather, and temperature, and welcome mode, and a plurality of indicators 84 to show a remaining battery, current time, or communication status. A voice input button 82 is a button to convert a voice perceiving mode which controls operations of the user terminal device 100 or the display apparatus 200 by utilizing user voices. Whenever the voice input button 82 is selected, the voice perceiving mode is activated or inactivated by a toggling method. Further, a button 83 to go back the welcome mode is displayed as an icon in FIG. 22; however, if a large portion displayed in a dot line is actually touched, the operation may go back to the welcome mode.

A center area of the home screen 80 displays a plurality of main menus 85, 86, and 87. Referring to FIG. 22, a music menu 85, a location menu 86, and a phone menu 87 are displayed. If the music menu 85 is selected, several functions related to playing music contents may be performed.

The music menu 85 indicates a context button 85-1. Within the context button 85-1, a music title may be displayed on an upper portion and an artist name may be on a lower portion. If the context button 85-1 is selected, corresponding music contents may play immediately. While playing music contents, if the context button 85-1 is selected again, playing may stop or pause. Regarding a radio function, a corresponding radio channel and a program title may be displayed. When playing a radio, on or off may be performed in response to selecting/non-selecting of the context button 85-1.

A location menu 86 is a menu to implement a GPS function. If a location menu 86 is selected, a screen may be converted to a screen displaying various service menus which can be provided based on the current position of the moving means 1000 or to a screen to receive a destination input. Within the location menu 86, a button 86-1 is displayed, according to which traveling to a registered place directly begins.

A phone menu 87 is a menu to connect a call. If the phone menu 87 is selected, a telephone dial pad or a contact list including pre-stored contact points may be displayed. Within the phone menu 87, a button 87-1 to directly call a previously registered person is displayed.

By selecting the buttons 85-1, 86-1, and 87-1 explained above, operations of playing contents, guiding routes, or calling may be performed on the main menu screen 80.

On a lower area of the home screen 80, a short key button 88 and a setting implement button 89 are displayed. The short key button 88 is a button to indicate one or more favorites which a user registers and direct go a list regarding other application programs. If short key button 88 is displayed, favorites or direct go list is displayed. If a specific function is selected on the list, the selected function is implemented immediately. If the setting implement button 89 is selected, a screen to adjust setting of the user terminal device 100 or the display apparatus 200 may be displayed.

FIG. 22 illustrates three main menus; however, the number of main menu may be variable according to a design or user preference.

Figure 23:
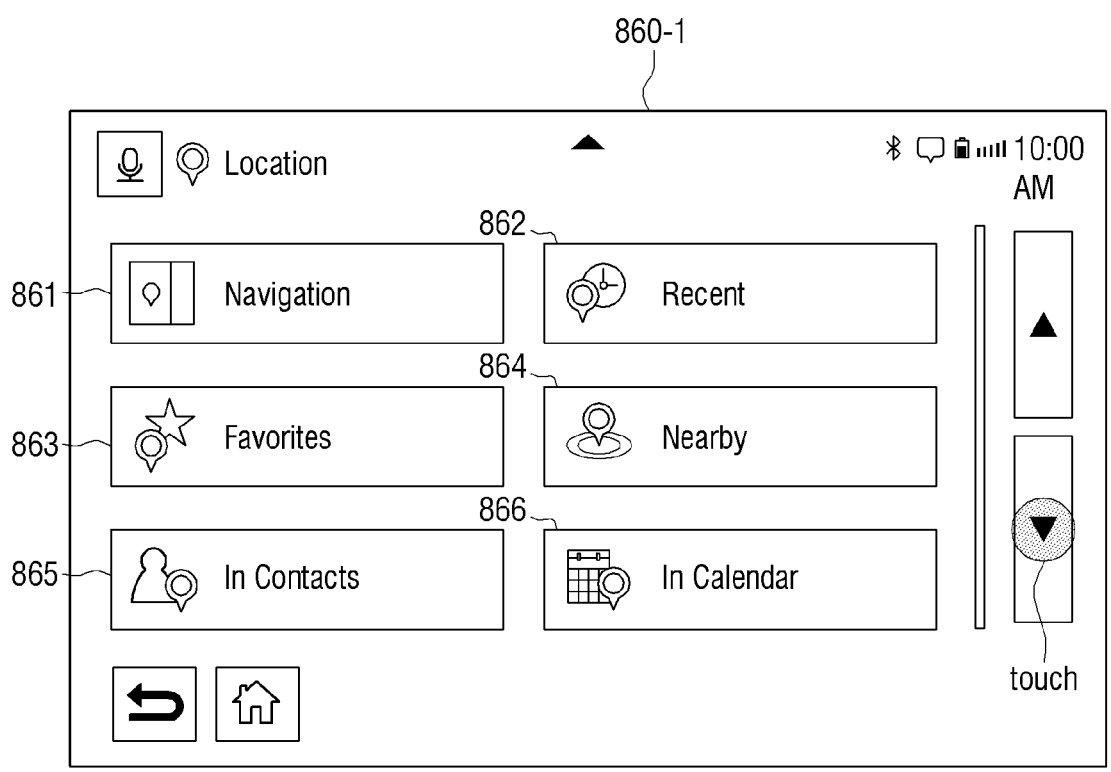

FIG. 23 illustrates an example of an operation of creating a screen displayed when a location menu 86 is selected on a screen of FIG. 22. Referring to FIG. 23, a plurality of menus, for example, first to fourth menus 861, 862, 864, 865, and 866 are displayed on a location service screen 860-1.

The first menu 861 is a menu to perform a GPS function. If the first menu 861 is selected, the user terminal device 100 may implement a GPS program and display map.

The second menu 862 is a menu to confirm latest visit position information, and the third menu 863 is a menu to confirm position information registered as favorites. The fourth menu 864 is a menu to confirm surrounded landing objects based on current user position, the fifth menu 865 is a menu to confirm position information regarding acquaintances recorded on the contact list, and the sixth menu 866 is a menu to confirm a location of place of schedule included in the schedule information.

On one side of the location service screen 860-1, direction buttons may be displayed. A user may touch direction buttons and convert to a next page which will be described later in FIG. 24.

Figure 24:
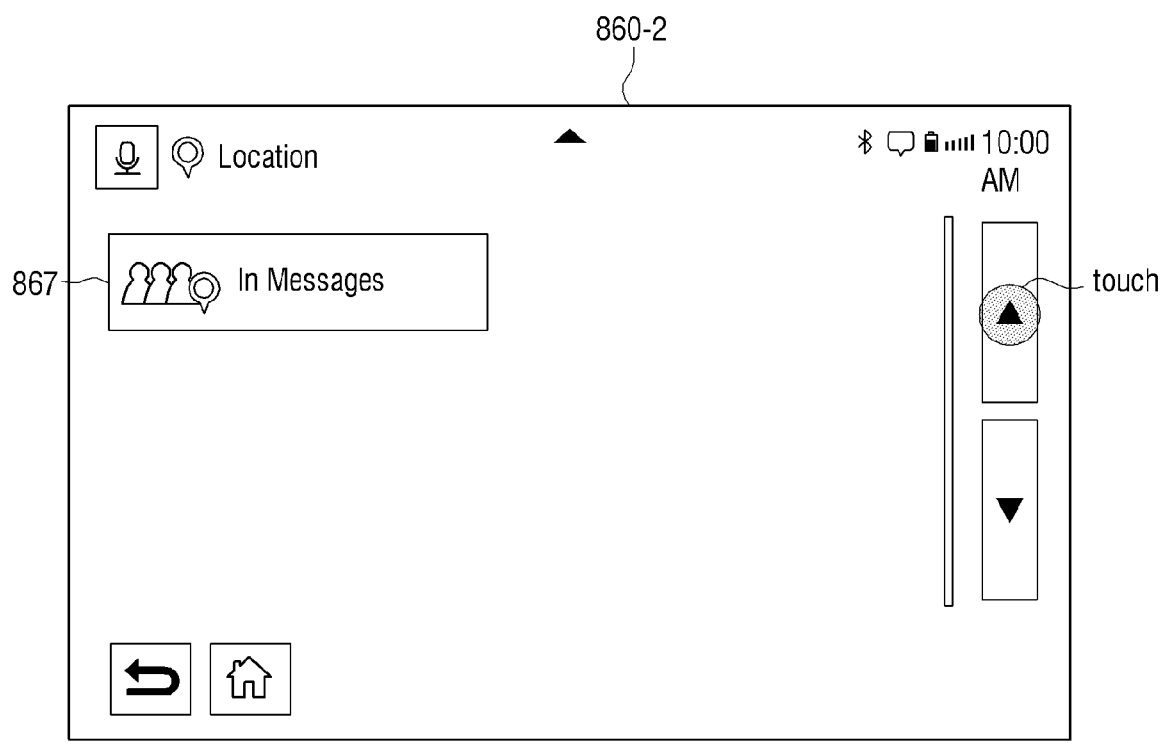

FIG. 24 illustrates a next (second) page 860-2 of the location service screen 860-1. The seventh menu 867 displayed on the second page 860-2 of the location service screen 860-2 is a menu to confirm position information included in various messages such as SMS, Multimedia Message Service (MMS), e-mail, messenger, and Social Network Service (SNS) message and positions of users utilizing the above messages. If the seventh menu 867 is selected, various submenus such as SMS, MMS, e-mail, messenger, or SNS message may be displayed according to functions which the user terminal device 100 supports. Thus, if a user selects the SMS, position information included in the SMS may be displayed with or without restriction.

If various position information is displayed on a screen by selecting the second to the seventh menus 862, 863, 864, 865, 866, and 867, a user may select one of position information. Accordingly, the selected position information may be automatically established as destination and route guiding may be performed immediately.

Figure 25:
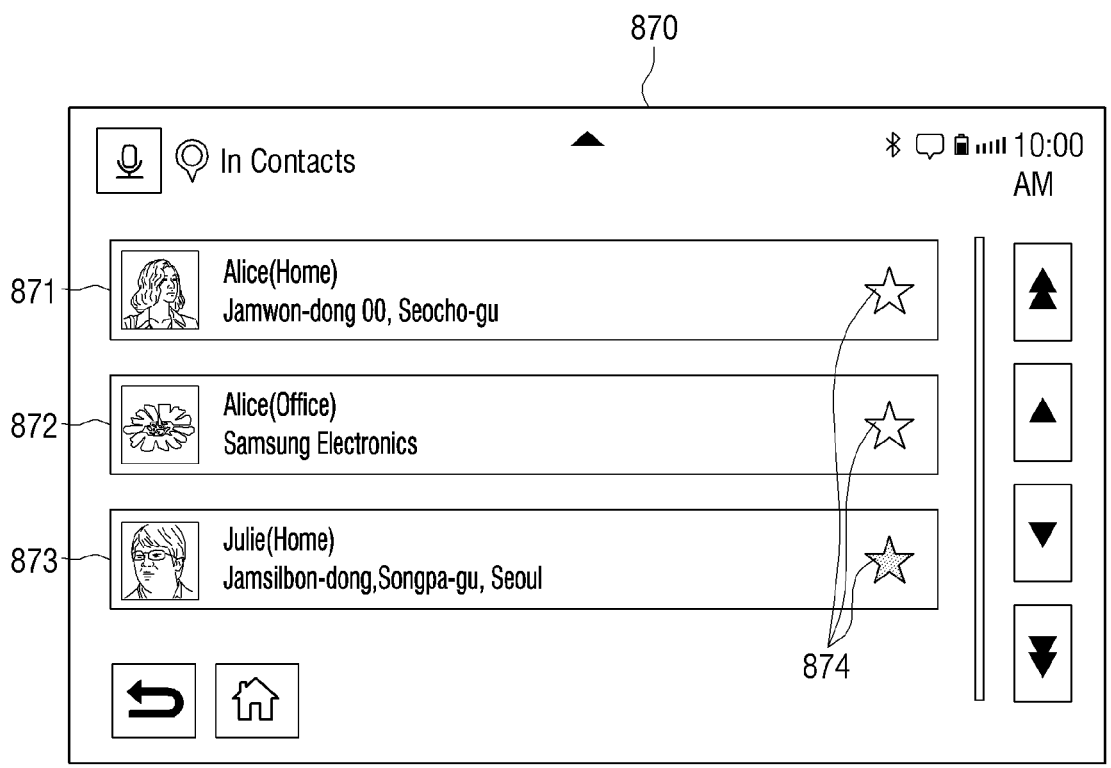

FIG. 25 illustrates an example of a screen 870 with position information displayed when the fifth menu 865 is selected. Referring to FIG. 25, cells 871, 872, and 873 including information regarding one or more persons registered in the user terminal device 100 are consecutively arranged and displayed on the position information screen 870. If one person has several position information, the position information may be displayed in a list according to series (or an order) that address information is stored in the contact list.

Arrangement order of each cell 871, 872, 873 may be variable and according to one or more criteria such as alphabetical order or the order of frequencies the cells are searched. Referring to FIG. 25, each cell may indicate various information including photos, people's names, categories (home, office), or addresses. The category may be displayed in icon format.

Further, each cell of FIG. 25 may mark add button 874. If the favorites add button 874 indicated on a specific cell is selected, position information corresponding to the cell may be added as a favorite place.

The above embodiments explain that base position information like acquaintance's home or office is previously registered, and route guide service to selected position information is provided if position information is selected; however, the route guide service may be provided by using temporary position information.

For example, on the position information screen 870 of FIG. 25, the position information indicated on each cell 871, 872, and 873 may display a current position of a corresponding person. Thus, if one cell is selected from the position information screen 870 of FIG. 25, the current position of the person corresponding to the selected cell may be tracked and a route guide service to the tracked position may be provided. In this case, the current position of the person corresponding to the selected cell may be obtained by receiving GPS coordinate information from a user terminal device of the person. Further, a local area of the person may be obtained by confirming a local communication station which a user terminal device of the person connects. Whenever the current position of another person is updated, the user terminal device 100 or the display apparatus 200 implementing a GPS program may search for one or more new routes to an updated position, re-create a route guide screen, and display the re-created screen.

The user terminal device 100 may utilize prestored personal information and provide various services when connecting to the display apparatus 200.

Further, the moving means 1000 may connect to another moving means through the user terminal device 100. In the following, based on an assumption that a moving means is implemented as a car, an embodiment of performing communication between cars will be explained.

Figure 26:
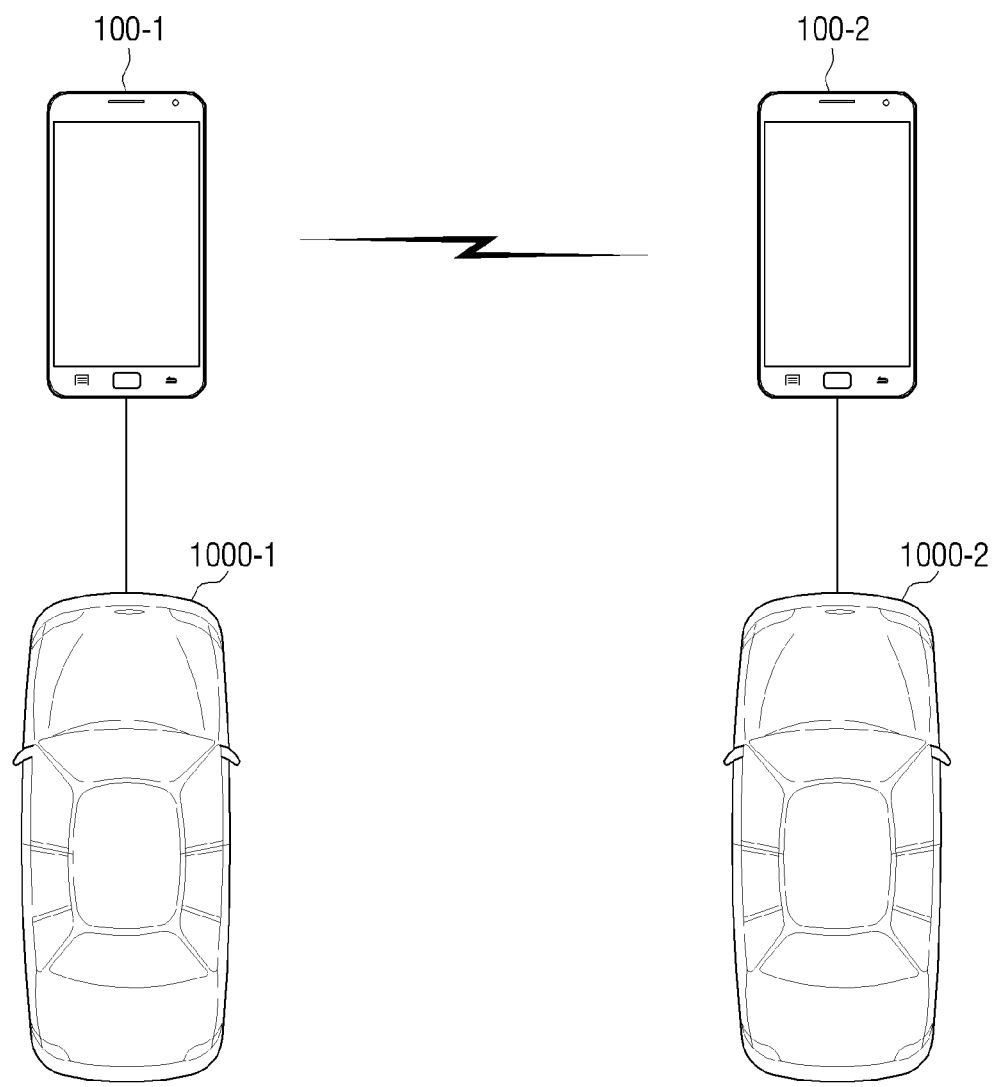
FIG. 26 illustrates an operation of performing synchronizing between a user device mounted on a moving means and an external device mounted on another moving means.

FIG. 26 illustrates one or more user terminal devices connected to different cars to be synchronized with each other. Specifically, a user terminal device 100-1 connected to a car 1000-1 and a user terminal device 100-2 connected to another car 1000-2 may be connected to each other and transmit and receive personal information stored in each device 100-1, 100-2.

Figure 27:
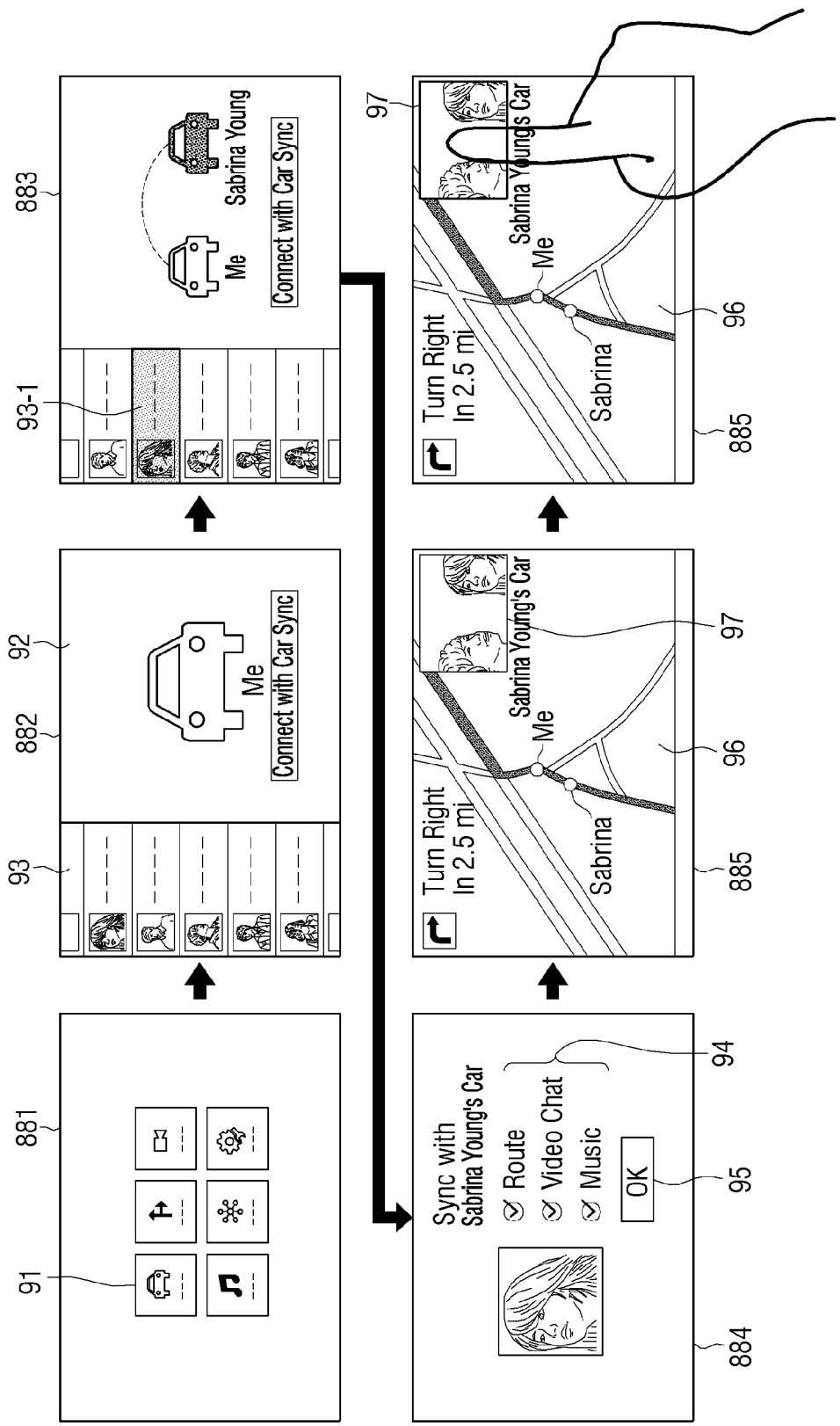
FIG. 27 illustrates a screen modifying process of a display apparatus in a service providing method according to an embodiment of the present general inventive concept.

FIG. 27 illustrates an example of an operation of creating a screen to connect communication between cars. Referring to FIG. 27, if the user terminal device 100 and the display apparatus 200 mounted on the moving means 1000 are connected, the display 220 of the display apparatus 200 displays a main screen 881. A plurality of menus is displayed on the main screen 881. A menu 91 to perform synchronization between cars is included.

If the corresponding menu 91 is selected, a screen 882 including an icon 91 regarding a user car to perform synchronization and a list 93 of one or more persons to be synchronized is displayed. A user may select at least one person from the list 93.

When one person 93-1 is selected, synchronizing between a user car and the selected person's car is implemented, and a screen 883 including an icon to inform that synchronizing is processing is displayed simultaneously.

The synchronization can be performed by communication between user terminal devices. Specifically, the user terminal device 100 may connect to a user terminal device that belongs to the selected person according to various communication methods such as Bluetooth, WiFi, 3G or 4G.

If synchronization completes, a screen 884 including a plurality of synchronizing items 94 and a confirm menu 95 is displayed. The synchronizing items 94 may include an item to share one or more routes, an item to chat on video, and an item to share music contents.

If the confirm menu 95 is selected while the item to share routes is selected, screen 885 including a map 96 and an interior image 97 of a car that belongs to the selected person is displayed like an illustration of FIG. 26. The map 96 indicates a current position of a user and a position of the synchronized person.

If a user selects the interior image 96 of a car, video telephony with a car of a synchronized person may be performed.

A user terminal device of synchronized person may also include constitutions (or components or units) illustrated in FIG. 2, and likewise, a display apparatus mounted on a car of synchronized person may include the constitutions (components or units) illustrated in FIG. 5.

Further, as described above, the user terminal device 100 may be implemented as a device performing various functions such as mobile phone.

Figure 28:
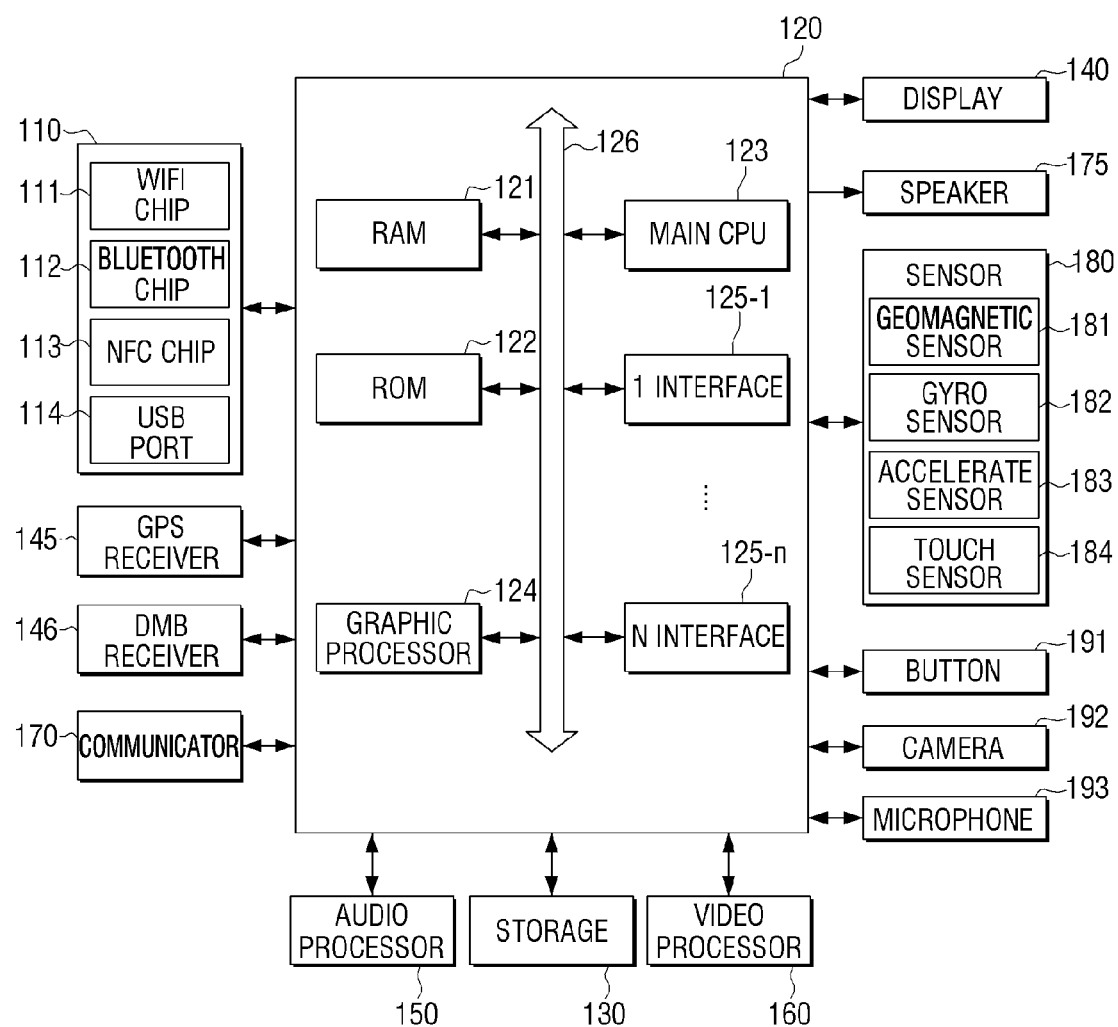
FIG. 28 is a detailed block diagram illustrating a user terminal device to provide one or more services according to an embodiment of the present general inventive concept.

FIG. 28 is a block diagram illustrating a user terminal device 100 according to an embodiment of the present general inventive concept.

Referring to FIG. 28, the user terminal device 100 includes an interface 110, a controller 120, a storage 130, a display 140, a GPS receiver 145, a digital media broadcasting (DMB) receiver 146, an audio processor 150, a video processor 160, a communicator 170, a speaker 175, a sensor 180, a button 191, a camera 192, and a microphone 193.

The interface 110 includes hardware according to various communication methods such as WiFi chip 111, Bluetooth chip 112, NFC chip 113, and USB port 114.

The WiFi chip 111, Bluetooth chip 112, and NFC chip 113 perform communication according to a WiFi communication method, Bluetooth method, and NFC method, respectively. The USB port 114 may perform communication with various external devices as well as the display apparatus 200.

The NFC chip 113 refers to a chip which operates with the NFC method utilizing a 13.56 MHz bandwidth among various RF-ID frequency bandwidths such as 135 KHz, 13.56 MHz, 433 MHz, 860~960 MHz, and 2.45 GHz. If the NFC chip 113 is utilized, the display apparatus 200 should have an NFC module. Accordingly, if a user performs tagging with the display apparatus 200, a door lock system or other external system connected to the display apparatus 200, information recorded in NFC chip 113 and information recorded in the NFC module of the display apparatus 200 may be shared with each other. Meanwhile, if the WiFi chip 111 or Bluetooth chip 112 is utilized, respective connect information such as SSID and session key may be transmitted and received first, and other respective information may be transmitted and received after connecting communication by using the connect information.

The GPS receiver 145 is a component which receives GPS signals from a GPS satellite and calculates a current position of the user terminal device 100. The DMB receiver 146 is a component which receives and processes Digital Multimedia Broadcasting (DMB) signals.

The audio processor 150 is a component which performs processing audio data. The audio processor 150 may perform various processing such as decoding, amplifying, or noise filtering regarding audio data.

The video processor 160 is a component which performs processing video data. The video processor 160 may perform various image processing such as decoding, scaling, noise filtering, frame rate converting, or resolution converting regarding video data.

The display 140 may display various screens or objects according to controlling of the controller 120. Specifically, the various screens described above may be displayed in the user terminal device 100.

The communicator 170 is a component which connects telephony by utilizing mobile communication network such as 3G or 4G, or performs various wireless communication by using an internet network. The communicator 170 may perform communication with various external devices as well as the display apparatus 200 mounted on the moving means 1000.

The speaker 175 is a component which outputs various alarm sounds or voice messages as well as audio data processed in the audio processor 150.

The sensor 180 is a component which senses user manipulation of the user terminal device 100 or state of the user terminal device 100. The sensor 180 may include various sensors such as a geomagnetic sensor 181, a gyro sensor 182, an accelerate sensor 183, or a touch sensor 184.

The geomagnetic sensor 181 is a sensor which senses changes in surrounded geomagnetic by using two axes or three axes fluxgate. The accelerate sensor 182 is sensor to measure accelerates and an accelerating direction when a motion occurs. The gyro sensor 183 is sensor to measure coriolis power working on a velocity direction and calculate an angular velocity if a rotation movement occurs.

The touch sensor 184 may be connected to the display 140 and can sense touch manipulation of a user as an user input. The touch sensor 184 may be implemented as electrostatic-capacitive or pressure-reduced. The 'electrostatic-capacitive touch sensor' refers to a sensor which uses a conductive material coated on a surface of the display 140, senses micro electricity excited by a body of a user when a portion of the user body touches a surface of the display 140, and calculates a coordinate value. The 'reduced-pressure touch sensor' refers to a touch sensor which includes two electrode panels formed within the display 140, senses a flow of electricity by contacting upper and lower panels on a touch point if a user touches a screen, and calculates a coordinate value. The sensor 180 calculates the coordinate value of a point which a user touches through the touch sensor and provides to the controller 120.

The controller 120 may perform various controlling operations according to various sensing signals provided from the sensor 180.

The user terminal device 100 may additionally include various components such as a button 191, a camera 192, or a microphone 193. The button 191 may be various types of buttons, such as mechanical button, touch pad, or wheel, which are formed on arbitrary area like a front, a side, or a back side on external main body of the user terminal device 100.

If the camera 192 and the microphone 193 are formed, the controller 120 may perform controlling operations according to user voices inputted through the microphone 193 or user motions sensed by the camera 192. In other words, the user terminal device 100 may operate in a motion controlling mode or a voice controlling mode. During an operation in the motion controlling mode, the controller 120 activates the camera 192, photographs a user, tracks changes in user motions, and performs a corresponding controlling operation.

For example, if address information registered in the contact list is selected or if event matching schedule information occurs, the user terminal device 100 may output a visual message or a sound message asking whether to set the address information as a destination. At this process, a user may pronounce a voice command to approve establishing a destination or make gestures to complete the establishing destination.

The operations of the controller 120 described above may be performed by programs stored in the storage 130.

The storage 130 may store various data such as O/S software to drive the user terminal device 100, various applications to use personal information, various data inputted or established while implementing applications, and contents. The controller 120 controls general implementation of the user terminal device 100 by utilizing various programs stored in the storage 130. Further, the controller 120 may control operations of the display apparatus 200 connected via the interface 110.

The controller 120 includes a RAM 121, a ROM 122, a main CPU 123, a graphic processor 124, a number of interfaces 125-1~125-n, and a bus 126.

The RAM 121, the ROM 122, the main CPU 123, the graphic processor 124, and first to nth interfaces 125-1~125-n may be connected to each other through the bus 126 and may transmit and receive various data or signals.

The first to nth interfaces 125-1~125-n may be connected to other units as well as units illustrated in FIG. 27 so that main CPU 123 can access.

The main CPU 123 accesses the storage 130 and performs booting by using O/S stored in the storage 130. Further, the main CPU 123 performs various operations by using various programs, contents, and data stored in the storage 130.

Specifically, the ROM 122 stores command language set or others to boot system. If a command to turn on is inputted and if electrical power is supplied, the main CPU 123 copies O/S stored in the storage 130 on RAM 121 according to a command stored in the ROM 122, implements an O/S and boots system. If booting completes, the main CPU 123 copies various application programs stored in the storage 130 on the RAM 121, implements the copied application programs, and performs respective functions.

The graphic processor 124 creates respective screens according to controlling of the main CPU 123. Specifically, the graphic processor 124 generates various screens such as one or more route guide screens or brief screens described above. The graphic processor 124 calculates an expressing state value of a screen. The expressing state value may be a coordinate value of a position which an object will be displayed on a screen, and feature values indicating object shape, size or color. If the expressing state value is calculated, the graphic processor 124 performs rendering based on the calculated value and generates screen. If a screen is created, the main CPU 123 controls the display 140 to display the created screen.

As described above, the controller 120 may copy programs stored in the storage 130 to the RAM 121, implement the copied programs, and perform various operations.

Figure 29:
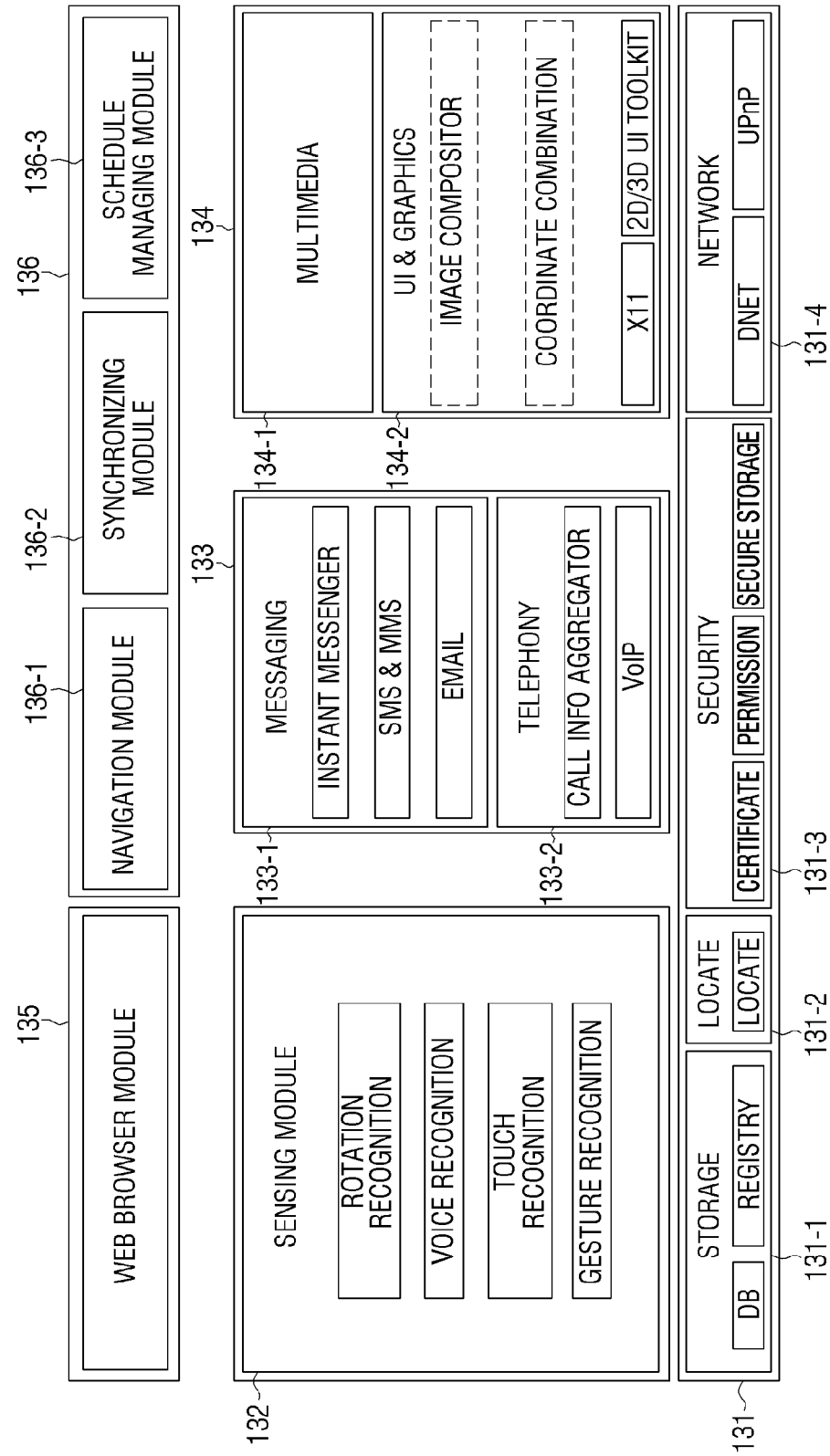
FIG. 29 illustrates program edits utilized in a user terminal device to provide one or more services according an embodiment of the present general inventive concept.

FIG. 29 is a diagram illustrating layers of programs stored in the storage 130. Referring to FIG. 29, the storage 130 includes a base module 131, a sensing module 132, a communicating module 133, a presentation module 134, a web browser module 135, and a personal information processing module 136.

The base module 131 is a basic module to process signals displayed from each hardware mounted on the user terminal device 100 and deliver the processed signals to an upper layer module.

The base module 131 includes a storage module 131-1, a position base (locate or location) module 131-2, a security module 131-3, and a network module 131-4.

The storage module 131-1 is a program module which manages database (DB) or registry. The main CPU 123 may utilize the storage module 131-1, access the DB within the storage 130, and read respective data. The position base module 131-2 is a program module which interlocks with respective hardware such as a GPS chip and provides a position base service. The security module 131-3 is a program module which supports certification of hardware, request permission or secure storage. The network module 131-4 is a module which supports a network connection, and includes a DNET module and an UPnP module.

The sensing module 132 is a module to manage and utilize information regarding external inputting and external devices. The sensing module 132 includes a rotation recognition module, a voice recognition module, a touch recognition module, and a gesture recognition module. The rotation recognition module is a program which uses a sensing value sensed by a sensor, such as the geomagnetic sensor 181 or the gyro sensor 182, and calculates a rotation angle and a rotation direction. The voice recognition module is a program which analyzes voice signals collected by the microphone 193 and extracts user voices. The touch recognition module is a program which uses a sensing value sensed by the touch sensor 184 and extracts a touch coordinate value. The gesture recognition module is a program which analyzes an image photographed by the camera 192 and recognizes user gestures.

The communication module 133 is a module to perform communication externally. The communication module 133 may include a messaging module 133-1 such as a messenger program, SMS & MMS program, or e-mail program, and telephony module 133-2 having a call information aggregator program module and a VoIP module.

The presentation module 134 is a module to create a display screen. The presentation module 134 includes a multimedia module 134-1 to play and output multimedia contents, and a UI & graphic module 134-2 to perform UI and graphic processing. The multimedia module 134-1 may include a player module, a camcorder module, and a sound processing module. Accordingly, the multimedia module 134-1 performs operations to play respective multimedia contents, create a screen and sound, and play the created screen and sound. The UI & graphic module 134-2 may include an image compositor module to combine one or more images, a coordinate combination module to combine and create a coordinate value on a screen which will display an image, an X11 module to receive respective events from hardware, and a 2D/3D UI toolkit which provides a tool to create a user interface (UI) in two dimension (2D) or three dimension (3D) format.

The web browser module 135 refers to a module to perform web browsing and access a web server. The web browser module 135 may include various modules such as a web view module to create a web page, download an agent module to perform downloading, a bookmark module, or a web kit module.

The personal information processing module 136 refers to program to process respective personal information stored in the storage 130. The GPS module 136-1 displays a map on a screen by using map information, calculates one or more routes between a current position determined by the GPS receiver 145 and a destination position, and performs an operation of displaying the routes on a map. If address information is displayed on the contact list or if an event matching the schedule information occurs, the main CPU 123 implements a GPS module 136-1, implements an UI & graphic module 134-2, and creates a route guide screen to address information or a place of a schedule.

The synchronizing module 136-2 is a component which performs synchronization with external devices. Specifically, the synchronizing module 136-2 is a component which transmits and receives respective synchronizing information as well as personal information with the display apparatus 200 mounted on the moving means 1000 or another user terminal device connected to another moving means.

The schedule manage module 136-3 is a component which manages schedule information among personal information. The schedule manage module 136-3 may store inputted schedule information in the storage 130 if schedule information is newly inputted. Further, the schedule manage module 136-3 may monitor to determine whether an event matching the schedule information stored in the storage 130 occurs, and, if an event occurs, provide address information included in the schedule information to the GPS module 136-1 so that address information can be used in setting destination. Further, the personal information processing module 136 may further include respective program module which creates various screen and provides the created screens to the display apparatus 200 as described above in FIGS. 19 to 26.

Further, the program modules illustrated in FIG. 29 may be partly excluded, modified, or newly added according to type or feature of the user terminal device 100. For example, an electronic book application, game application and extra utility programs may be further included. A portion of the program modules in FIG. 29 may be excluded according to a design or user preference. The composition of FIG. 28 and the composition of FIG. 29 may be also applied to the display apparatus 200 as well as the user terminal device 100.

Meanwhile, as described above, various embodiments of the invention may be performed by the user terminal device 100 only; however, they may be implemented when the user terminal device 100 and the display apparatus 200 connect to each other.

Figure 30:
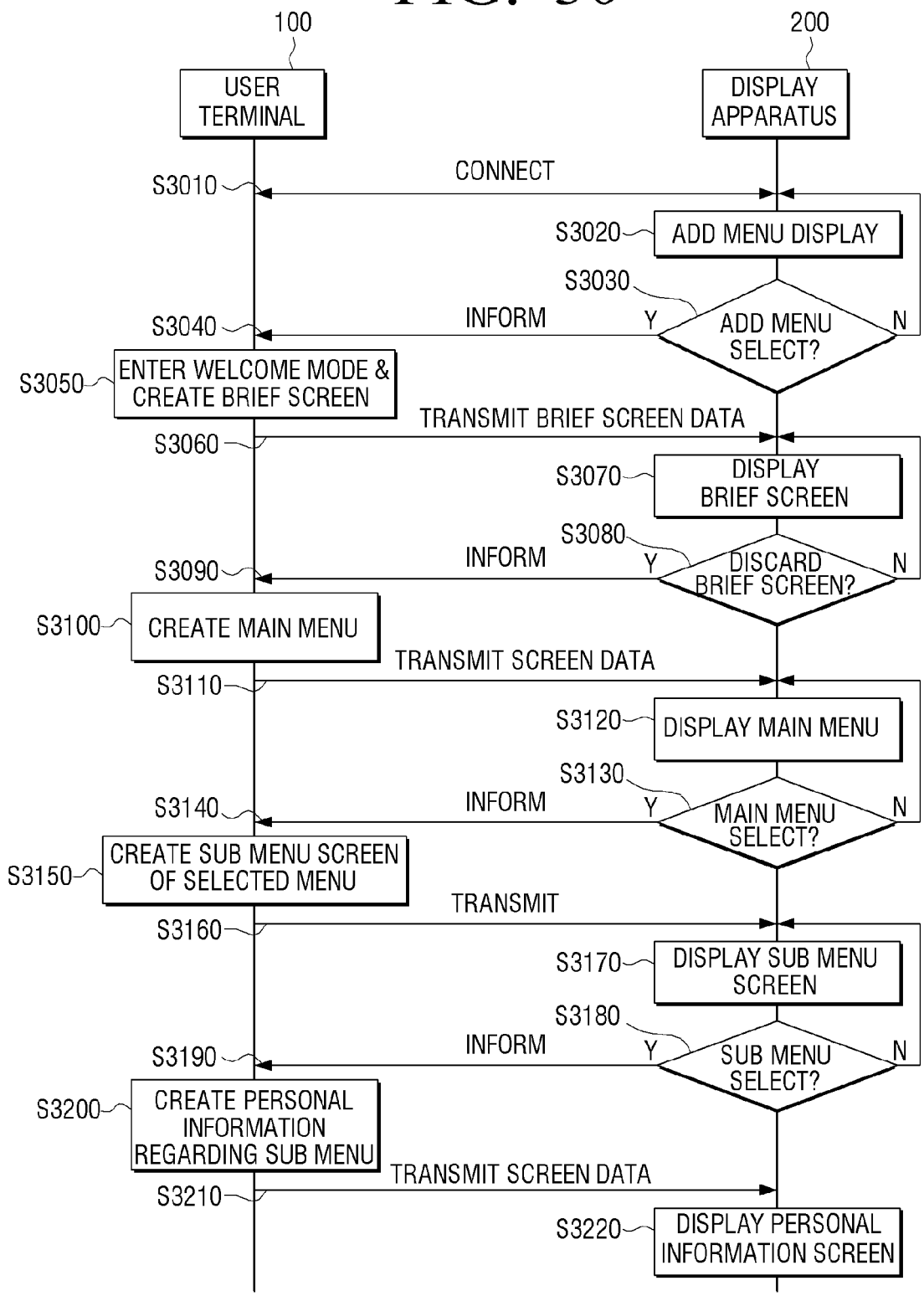
FIG. 30 is a timing diagram illustrating interoperational process of a user terminal device and a display apparatus according to an embodiment of the present general inventive concept.

FIG. 30 is a timing diagram illustrating operations when the user terminal device 100 and the display apparatus 200 are connected to each other according to an embodiment of the present general inventive concept.

Referring to FIG. 30, if the display apparatus 200 is turned on as a car is starting up or when it is ready for starting up, the display apparatus 200 creates and display a menu screen according to a control of a controller of the display apparatus 2000 and/or the car. While displaying, if the user terminal device 100 and the display apparatus 200 connect to each other at operation S3010, an add menu is displayed on the menu screen of the display apparatus 200 at operation S3020. The add menu refers to a menu to perform one or more services which utilize respective personal information stored in the user terminal device 100. An icon, a display position, and a layout regarding the add menu may be created by one or more programs performed in the user terminal device 100 and provided to the display apparatus 200.

A user may select the add menu displayed on the display apparatus 200 and can implement a link service of the user terminal device 100 and the display apparatus 200 at S3030.

Specifically, if a user touch is made on a portion of a screen, the display apparatus 200 transmits a coordinate value of the touched point to the user terminal device 100 or signals to inform that the add menu is selected to the user terminal device 100.

If it is determined that the add menu is selected according to signals transmitted from the display apparatus 200, the user terminal device 100 enters a welcome mode and creates brief screen at operation S3050. Specifically, a screen as the one illustrated in FIG. 19 may be created.

The user terminal device 100 transmits data regarding the created brief screen to the display apparatus 200 at S3060 so that the display apparatus 200 displays the brief screen at S3070. Referring to FIG. 19, a user may utilize the brief screen to confirm a current temperature, weather, local area, time, schedule and extra various information. While confirming the brief screen, if a user selects a discard menu to discard the brief screen, the display apparatus 200 transmits a touch coordinate value or signals to inform that a corresponding menu is selected to the user terminal device 100 at operation S3090.

If it is determined that the discard menu is selected regarding the brief screen, the user terminal device 100 may create the main menu screen at operation S3100, and provide the created screen to the display apparatus 200 at operation S3110. The display apparatus 200 displays the provided main menu at S3120. Specifically, the main menu screen in a format of FIG. 22 may be displayed, although not limited thereto. A type of a main menu, an icon shape, an icon mark position, and a layout may be variable according to a design or user preference.

If a user selects a specific main menu on the main menu screen at S3130, the display apparatus 200 transmits a touch coordinate value or signals to inform that a menu is selected to the user terminal device 100 at S3140.

The user terminal device 100 creates a sub menu screen regarding the selected main menu at operation S3150, and provides the aerated screen to the display apparatus 200 at operation S3160. Specifically, if the location menu 86 is selected on the main menu screen 80 in FIG. 22, data regarding the sub menu screen 860-1 and 860-2 in FIGS. 23 and 24 may be created and provided to the display apparatus 200.

If data regarding the sub menu screen is received, the display apparatus 200 uses received data and displays the sub menu screen at operation S3170.

If it is determined that the sub menu is selected on the sub menu screen displayed on the display apparatus 200 at operations S3180 and S3190, the user terminal device 100 creates a personal information screen according to the sub menu at operation S3200, and provides the created screen to the display apparatus 200 at operation S3210.

For example, if the fifth menu 865, i.e., 'In contacts' menu, is selected on the sub menu screen 860-1 of FIG. 23, the position information regarding acquaintances registered in the contact list may be confirmed. The personal information screen 870 in a format of FIG. 25 may be created and provided to the display apparatus 200. Otherwise, if the sixth menu 866, i.e., 'In Calendar' menu is selected on the sub menu screen 860-1, the place information included in the prestored schedule information may be used, and route guide service to the place may be provided. Since a method of providing a route guide service based on schedule information can be implemented like the embodiments described above, detail descriptions thereof will not be included herein for the sake of brevity. Otherwise, if the seventh menu 867 is selected on the second page 860-2 of the sub menu screen, the sub menu screen to select types of message that will be searched may be displayed again. For example, a user can select whether to search in an SMS, e-mail, or extra SNS message through sub menu screen.

Therefore, if a type of a message to be searched is selected, the user terminal device 100 may use respective position information related with the selected message and implement route guide service. Other than the detailed address information, the position information may also include various types of information which can mark places, such as building names, shop names, landmarks, or nicknames.

Meanwhile, the SMS message, e-mail, messenger, and SNS message may be stored in a web mail server, a communication provider server, or an SNS server, rather than at the user terminal device 100. However, since information relates to a user's personal information, the above messages are considered to be included in an area of personal information described above according to various embodiments.

The display apparatus 200 may display a personal information screen 870 according to provided data at S3220. Specifically, a screen 870 of FIG. 25 may be displayed.

If a user selects specific information on the personal information screen, the user terminal device 100 performs a function corresponding to the selected information. For example, if one is selected from the cell 871, 872, 873 displayed on the personal information screen 870 of FIG. 25, the position information corresponding to the selected cell may be used and a route guide service may be implemented.

Meanwhile, FIG. 30 illustrates an example in which the add menu is displayed on the display apparatus 200 when the user terminal device 100 and the display apparatus 200 connect to each other. However, the menu corresponding to the add menu may be displayed on a screen of the user terminal device 100. If such a menu is selected, the user terminal device 100 may display the above described brief screen, main menu screen, sub menu screen, or extra personal information screen using the display 140, and provide services by a user selection.

Figure 31:
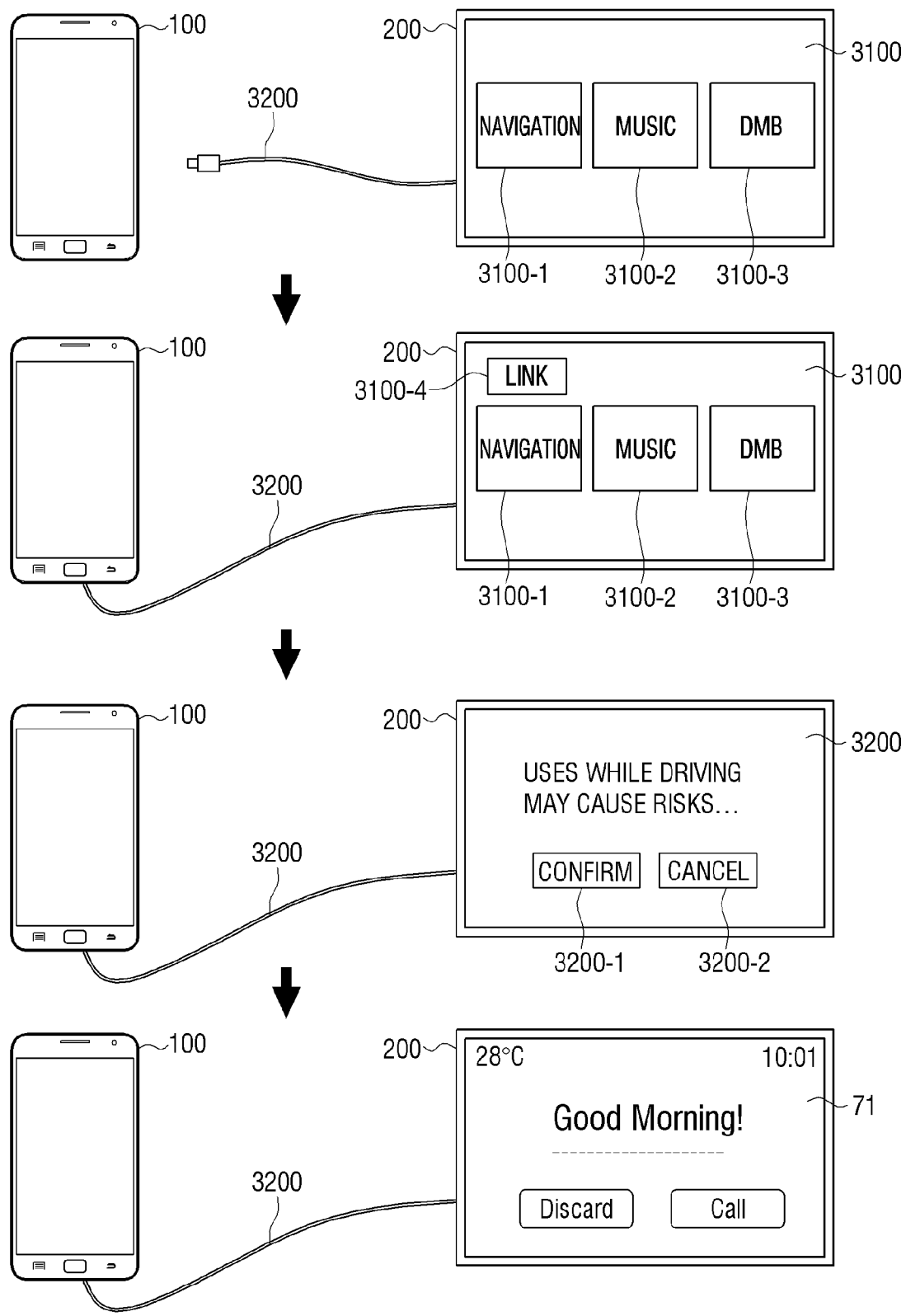
FIG. 31 is a diagram illustrating a screen modifying process of a display apparatus according to an embodiment of FIG. 30.

FIG. 31 illustrates an example of an operation of creating a screen displayed on the display apparatus 200 connected to the user terminal apparatus 100 as illustrated in FIG. 30. Referring to FIG. 31, the user terminal device 100 and the display apparatus 200 may be connected to each other through a USB cable 3200 for example.

Before connecting, the display apparatus 200 displays a self-menu screen 3100. The self-menu screen 3100 displays respective menus 3100-1, 3100-2, 3100-3 which can be supported by the display apparatus 200.

While displaying, if the user terminal device 100 and the display apparatus 200 connect to each other, the self-menu screen 3100 displays an add menu 3100-4. Although not illustrated in FIG. 31, if the user terminal device 100 and the display apparatus 200 connect to each other, a screen informing that connecting is in process may be displayed for a time taken to connect each other. Specifically, after displaying the screen of FIG. 17 for a predetermined time, the screen 3100 including the add menu 3100-4 may be displayed.

If a user selects the add menu 3100-4, the display apparatus 200 may display a screen 3200 warning risks which can occur caused by linking between devices. A user may select menus 3200-1, 3200-2 displayed on screen 3200, and implement link function or cancel link.

If a link (confirm) menu 3200-1 is selected, the user terminal device 100 may create and display the brief screen 70 in a format illustrated in FIG. 19. After the selecting, respective services may be provided, using personal information according to user manipulation as described above.

Meanwhile, if connecting with the display apparatus 200 completes or if the add menu 3100-4 is selected, the user terminal device 100 may turn off the display 140 and save unnecessary electrical power consumption.

Thus, if a user terminal device connects to a display apparatus mounted on a moving means, the brief screen may be created by using personal information of a user terminal device and displayed through a display apparatus.

After displaying the brief screen on a display apparatus, the main menu screen or the sub menu screen as described above may be displayed through a display apparatus. If a user selects one menu, a screen including personal information corresponding to the selected menu may be created and displayed through a display apparatus.

If one of personal information is selected on the screen, a service screen corresponding to the selected personal information may be created and displayed by using a display apparatus. In this case, the service screen may be various service screens such as a route guide screen, a video telephony screen, or a schedule guide screen.

The methods according to various embodiments described above may be generated by one or more program and formed on a user terminal device or a display apparatus.

Specifically, according to an embodiment, a user terminal device may mount non-temporary readable medium storing programs to implement displaying pre-stored contact list, and guiding routes which displays route guide screen to selected address information by using a display apparatus, if address information is selected from personal information recorded on the displayed contact list.

Further, according to an embodiment, a user terminal device may mount non-temporary readable medium storing programs to implement monitoring whether an event matching pre-stored schedule information occurs, creating a route guide screen to a place matching the event when the event occurs, transmitting the created screen to a display apparatus, and displaying the created screen.

Further, according to an embodiment, a user terminal device may mount non-temporary readable medium storing programs to perform a method combining personal information and fixed texts and creating a brief screen.

The above various methods may be performed singularly or in combination of more than two methods according to embodiments. According to the above various embodiments, various services can be provided by using personal information and user satisfaction degree may be greatly enhanced.

The non-temporary readable medium refers to a medium which stores data semi-permanently and can be read by devices, rather than a medium which stores data temporarily such as register, cache, or memory. Specifically, the above various applications or programs may be stored and provided in non-temporary readable medium such as CD, DVD, hard disk, Blu-ray disk, USB, memory card, or ROM.

Further, the foregoing exemplary embodiments and advantages are merely exemplary and are not to be construed as limiting the present invention. The present teaching can be readily applied to other types of apparatuses.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A service providing method of a user terminal device connected to a display apparatus mounted on a moving means, the service providing method comprising:

displaying a contact list stored in the user terminal device;

guiding one or more routes by displaying a route guide screen to a selected address information using the display apparatus when the address information is selected from among personal information of the displayed contact list, wherein the guiding of the routes comprises transmitting the address information to the display apparatus when the address information is selected on the user terminal by a user making the selection of the address information using only the user terminal, wherein the route guide screen is created using the address information by a global positioning system (GPS) program implemented in the display apparatus, and wherein the user terminal device automatically searches for a current position of one or more acquaintances registered on the contact list and additionally mark a position of the respective acquaintances on the route guide screen if acquaintances are located around the routes which are currently displayed on the route guide screen.

2. The service providing method of claim 1, wherein the guiding routes comprises:
   implementing a GPS program and creating the route guide screen in the user terminal device when the address information is selected; and
   transmitting the route guide screen to the display apparatus such that the route guide screen is displayed on the display apparatus.

3. The service providing method of claim 1, further comprising:
   searching for one or more external devices storing schedule information overlapped with the schedule information matching the event when the event occurs;
   displaying a list of one or more users regarding the searched external devices; and
   re-creating another route guide screen by updating positions of selected users when one or more users are selected from the list, and transmitting the re-created route guide screen to the display apparatus such that the re-created route guide screen is displayed on the display apparatus.

4. The service providing method of claim 1, further comprising:
   sharing the screen displayed on the user terminal device with the display apparatus when the user terminal device is connected to the display apparatus.

5. A user terminal device, comprising:
   an interface connectable to a display apparatus mounted on a moving means;
   a storage to store a contact list;
   a display to display the contact list stored in the storage; and
   a controller configured to display a route guide screen corresponding to selected address information using the display apparatus when the address information is selected from among personal information of the displayed contact list,
   wherein the address information is selected by a user making the selection of the address information using only the user terminal, the controller transmits the address information via the interface to the display apparatus,
   wherein the route guide screen is created and displayed using the address information by a global positioning system (GPS) program which is implemented on the display apparatus, and
   wherein the user terminal device automatically searches for a current position of one or more acquaintances registered on the contact list and additionally mark a position of the respective acquaintances on the route guide screen if acquaintances are located around the routes which are currently displayed on the route guide screen.

6. The user terminal device of claim 5, wherein, when the address information is selected, the controller implements a GPS program, creates the route guide screen, and transmits the route guide screen via the interface to the display apparatus.

7. The user terminal device of claim 5, wherein the controller searches for one or more external devices storing schedule information overlapped with the schedule information matching the event when the event occurs, displays a list of one or more users regarding the searched external devices, re-creates the route guide screen by updating positions of selected users when one or more users are selected on the list, and displays the re-created route guide screen using the display apparatus.

8. The user terminal device of claim 5, wherein, when the display apparatus is connected to the user terminal device via the interface, the controller shares the screen displayed on the display with the display apparatus.

9. A method of utilizing personal information of a user terminal device, the method comprising:
   creating a brief screen by utilizing the personal information of the user terminal device and displaying the brief screen through a display apparatus when the user terminal device is connected to the display apparatus mounted on a moving means;
   creating a menu screen and displaying the menu screen through the display apparatus when a user command to discard the brief screen is inputted;
   creating a screen including the personal information corresponding to a selected menu and displaying the created screen through the display apparatus when the selected menu is selected from the menu screen; and
   creating a service screen corresponding to the selected personal information and displaying the service screen by utilizing the display apparatus when one of the personal information is selected from the screen,
   wherein a position and a layout of an object on the brief screen of the display apparatus are different from those of the same object on brief screen of the user terminal,
   wherein while transmitting and receiving information between the user terminal and the display apparatus, mutual recognition using media access control (MAC) address is performed, and
   wherein the user terminal device automatically searches for a current position of one or more acquaintances registered on a contact list and additionally mark a position of the respective acquaintances on a route guide screen if acquaintances are located around the routes which are currently displayed on the route guide screen.

* * * * *